United States Patent
Kadokura et al.

(10) Patent No.: US 12,521,084 B2
(45) Date of Patent: Jan. 13, 2026

(54) ULTRASONIC DIAGNOSTIC APPARATUS

(71) Applicant: Konica Minolta, Inc., Tokyo (JP)

(72) Inventors: Masahiko Kadokura, Ogaki (JP); Koji Oura, Yokohama (JP); Kaoru Okada, Hino (JP); Takashi Mizuno, Kokubunji (JP)

(73) Assignee: Konica Minolta, Inc., Tokyo (JP)

( * ) Notice: Subject to any disclaimer, the term of this patent is extended or adjusted under 35 U.S.C. 154(b) by 120 days.

(21) Appl. No.: 18/225,202

(22) Filed: Jul. 24, 2023

(65) Prior Publication Data

US 2024/0050060 A1 Feb. 15, 2024

(30) Foreign Application Priority Data

Aug. 9, 2022 (JP) .................................. 2022-127022

(51) Int. Cl.
*A61B 10/00* (2006.01)
*A61B 8/00* (2006.01)
(Continued)

(52) U.S. Cl.
CPC ............ *A61B 8/0841* (2013.01); *A61B 8/463* (2013.01); *A61B 10/0045* (2013.01); *A61B 10/0233* (2013.01)

(58) Field of Classification Search
CPC .................. A61B 8/0841; A61B 90/13; A61B 2017/3413; A61B 2090/067;
(Continued)

(56) References Cited

U.S. PATENT DOCUMENTS

| | | | |
|---|---|---|---|
| 2013/0218024 A1* | 8/2013 | Boctor | A61B 8/4416 600/476 |
| 2016/0081653 A1* | 3/2016 | Masuda | A61B 8/0841 600/424 |

(Continued)

FOREIGN PATENT DOCUMENTS

| | | | | |
|---|---|---|---|---|
| CN | 111437011 A | * | 7/2020 | ............. A61B 34/30 |
| JP | 2011-505227 A | | 2/2011 | |

(Continued)

OTHER PUBLICATIONS

Japanese Office Action (JPOA) dated Nov. 11, 2025 issued for Japanese patent application No. 2022-127022 and its English machine translation.

(Continued)

*Primary Examiner* — Amal Aly Farag
(74) *Attorney, Agent, or Firm* — RANKIN, HILL & CLARK LLP

(57) ABSTRACT

An ultrasonic diagnostic apparatus that assists an insertion task of a puncture needle into a subject is provided. The ultrasonic diagnostic apparatus includes: an ultrasonic probe that acquires an ultrasonic image of an inside of the subject by transmitting and receiving ultrasonic waves; first and second optical cameras attached to the ultrasonic probe and capturing the puncture needle at the insertion task; and a hardware processor. The hardware processor performs image analysis on first and second images generated by the first and second optical cameras, respectively, and detects an insertion angle of the puncture needle relative to a body surface of the subject using a stereo camera principle. The hardware processor calculates a predicted arrival position of the puncture needle from the insertion angle, and displays a guide image indicating the predicted arrival position on a monitor so as to be superimposed on the ultrasonic image.

16 Claims, 20 Drawing Sheets

(51) Int. Cl.
*A61B 8/08* (2006.01)
*A61B 10/02* (2006.01)

(58) Field of Classification Search
CPC ........ A61B 2090/364; A61B 2090/365; A61B 2090/371; A61B 17/3403
See application file for complete search history.

(56) References Cited

U.S. PATENT DOCUMENTS

| | | | |
|---|---|---|---|
| 2016/0119529 A1* | 4/2016 | Stolka | A61B 8/466 348/211.1 |
| 2022/0104886 A1 | 4/2022 | Blanchard et al. | |
| 2022/0160434 A1* | 5/2022 | Messerly | A61B 5/318 |
| 2022/0202702 A1* | 6/2022 | Evans | A61K 9/0019 |

FOREIGN PATENT DOCUMENTS

| | | |
|---|---|---|
| JP | 2016506781 A | 3/2016 |
| JP | 2017-176638 A | 10/2017 |
| JP | 2018023610 A | 2/2018 |

OTHER PUBLICATIONS

Takahashi, "Research on Ultrasonically Guided peripheral nerve block Support System", Life Support, Mar. 31, 2019, vol. 31, No. 1, p. 1; a concise explanation of the relevance is included in JPOA; Cited in JPOA.

* cited by examiner

FIG. 20
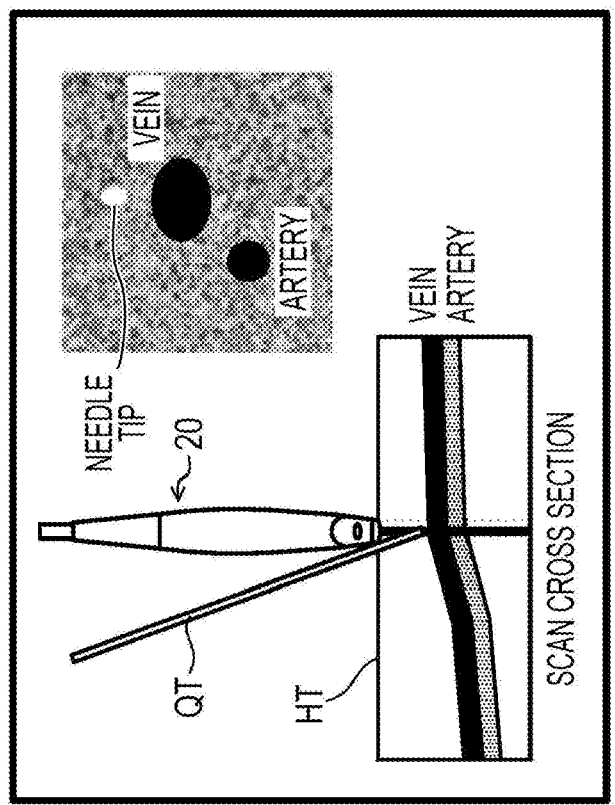
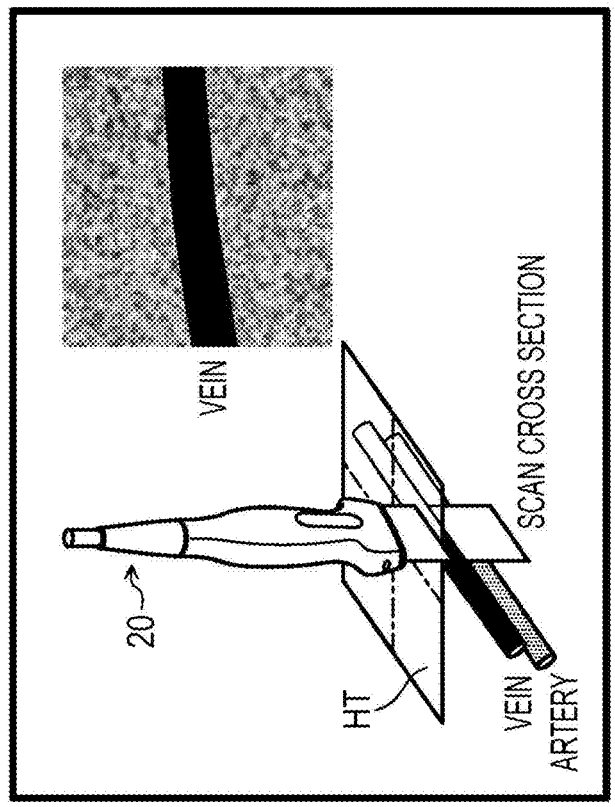

ULTRASONIC DIAGNOSTIC APPARATUS

The entire disclosure of Japanese patent Application No. 2022-127022, filed on Aug. 9, 2022, is incorporated herein by reference in its entirety.

BACKGROUND

Technological Field

The present disclosure relates to an ultrasonic diagnostic apparatus.

Description of the Related Art

There has been known an ultrasonic diagnostic apparatus that assists a task of inserting a puncture needle into a subject by capturing an inside of the subject as an ultrasonic image. The ultrasonic diagnostic apparatus can acquire a shape, movement, and the like of tissue in the subject as an ultrasonic image by a simple operation of applying an ultrasonic probe to a body surface of the subject.

In recent years, subject tissue diagnosis in which a puncture needle is inserted into a body of a patient as a subject to collect tissue and body fluid has been performed. In addition, treatments using a puncture needle are performed at anesthesiology departments, intensive care units, pain clinics, and the like. During these diagnoses or treatments, an operator such as a doctor (hereinafter referred to as a "user") inserts the puncture needle into the subject while viewing an ultrasonic image of a subject tissue acquired by the ultrasonic diagnostic apparatus to confirm the positions of the subject tissue and the puncture needle.

At that time, in order to reduce the burden on the patient as much as possible and perform the puncture accurately, it is necessary to accurately grasp a positional relationship between an insertion position of the puncture needle on the body surface of the patient and an affected site (that is, a target) in the ultrasonic image displayed on a monitor.

In light of such a background, various techniques for assisting the task of inserting a puncture needle into a subject (hereinafter also referred to as a "puncturing task") have been developed for an ultrasonic diagnostic apparatus.

For example, JP 2011-505227 A discloses a needle guide attached to an ultrasonic probe. JP 2011-505227 A discloses that the needle guide is configured such that a puncture needle can be inserted at a predetermined insertion angle relative to a subject, thereby assisting the task of inserting the puncture needle into the subject. In addition, JP 2011-505227 A discloses displaying a guideline for a puncture needle to be guided by a needle guide on a monitor so as to enable a user to recognize an entry direction of the needle.

In addition, JP 2017-176638 A discloses providing a mark for indicating a center position of an ultrasonic image (that is, a center position in a scan direction) on a housing body surface of the ultrasonic probe, and by providing the mark, enabling a user to accurately recognize the center position in a scan direction when puncturing a subject with a puncture needle.

However, while a needle guide such as is disclosed in the prior art according to JP 2011-505227 A is useful in terms of simplifying the task of puncturing a subject, since an angle at which the needle guide can guide the puncture needle is fixed, depending on the situation, there may be cases where the needle guide cannot be used or conversely impairs convenience.

For example, in the task of puncturing a central vein such as an external jugular vein of a human (for example, a puncturing task for inserting a catheter), flow of a blood vessel is generally confirmed by a parallel method (see the left-hand diagram of FIG. 20), while a task of puncturing a blood vessel is performed by an intersecting method (see the right-hand diagram of FIG. 20). At this time, since the user views the ultrasonic image to confirm a state in which the puncture needle is inserted into the blood vessel and corrects a trajectory of the puncture needle while performing the puncturing task, the procedure is performed freehand Note that FIG. 20 illustrates how the ultrasonic probe is pressed to the body surface of the subject in each of the parallel method (left-hand diagram in FIG. 20) and the intersecting method (right-hand diagram in FIG. 20), and an ultrasonic image acquired at that time. In FIG. 20, reference numeral 20 denotes the ultrasonic probe, HT denotes the subject, and QT denotes the puncture needle.

In addition, with the puncturing task, there are frequent cases in which a puncture target site exists at a position that is deviated from the puncture guideline guided by the needle guide. In such cases, the user detaches the needle guide from the ultrasonic probe and performs the puncturing task freehand.

Meanwhile, as in the conventional technique according to JP 2017-176638 A, it is difficult to accurately grasp the positional relationship between the puncture target site and the puncture needle only by the mark attached to the housing of the ultrasonic probe, and unless handled by a skilled user, the puncture needle may be inserted from the body surface of the subject in a state in which the puncture needle has deviated from an appropriate position or angle when advanced toward the target position of the tissue (for example, a central vein) inside the subject. As a result, the puncture needle may damage other tissues (for example, an artery, a nerve, or the like).

SUMMARY

The present disclosure has been made in view of the above problems, and it is an object of the present disclosure to provide an ultrasonic diagnostic apparatus that makes a task of inserting a puncture needle into the subject by a user easier.

To achieve the abovementioned object, according to an aspect of the present invention, an ultrasonic diagnostic apparatus that assists an insertion task of a puncture needle into a subject reflecting one aspect of the present invention comprises: an ultrasonic probe that acquires an ultrasonic image of an inside of the subject by transmitting and receiving ultrasonic waves; a first capture part and a second capture part that are attached to the ultrasonic probe and capture the puncture needle at the insertion task; and a hardware processor that performs image analysis on a first captured image generated by the first capture part and a second captured image generated by the second capture part, and detects an insertion angle of the puncture needle relative to a body surface of the subject using a stereo camera principle, calculates a predicted arrival position of the puncture needle from the insertion angle, and displays a guide image indicating the predicted arrival position on a monitor so as to be superimposed on the ultrasonic image.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 20 is a diagram illustrating how the ultrasonic probe is pressed to the body surface of the subject in each of a parallel method (left-hand view in FIG. 20) and an intersecting method (right-hand view in FIG. 20).

DETAILED DESCRIPTION OF EMBODIMENTS

Figure 1:
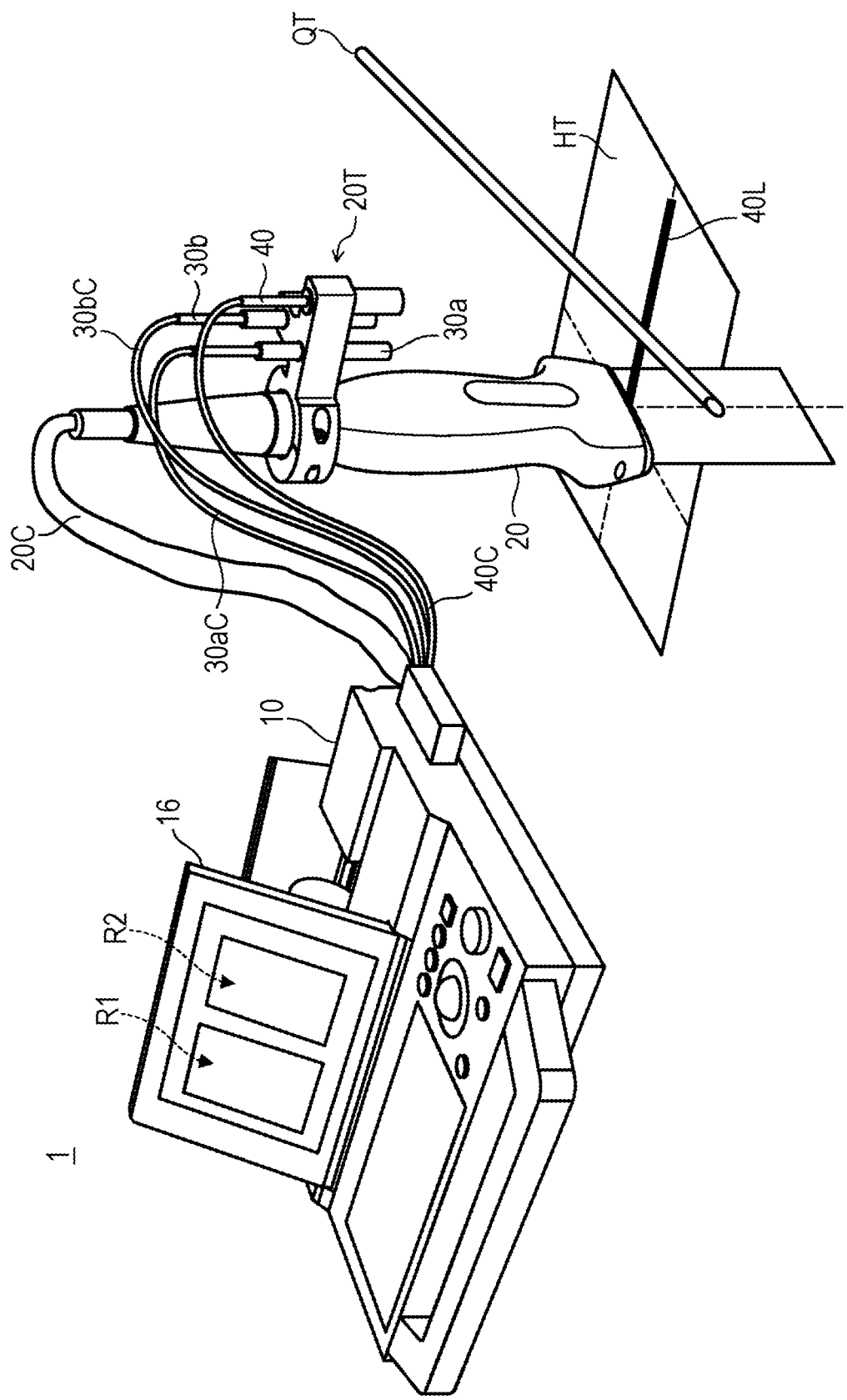
FIG. 1 is a diagram illustrating an overall configuration of an ultrasonic diagnostic apparatus according to an embodiment of the present invention.

Hereinafter, one or more embodiments of the present invention will be described with reference to the drawings. However, the scope of the invention is not limited to the disclosed embodiments. Note that in the present specification and the drawings, redundant description is omitted by denoting constituent elements having substantially identical functions using the same reference numerals.

[Overall Configuration of Ultrasonic Diagnostic Apparatus]

First, an overall configuration of an ultrasonic diagnostic apparatus according to an embodiment of the present invention (hereinafter referred to as an "ultrasonic diagnostic apparatus 1") is described with reference to FIGS. 1 to 3.

Figure 2:
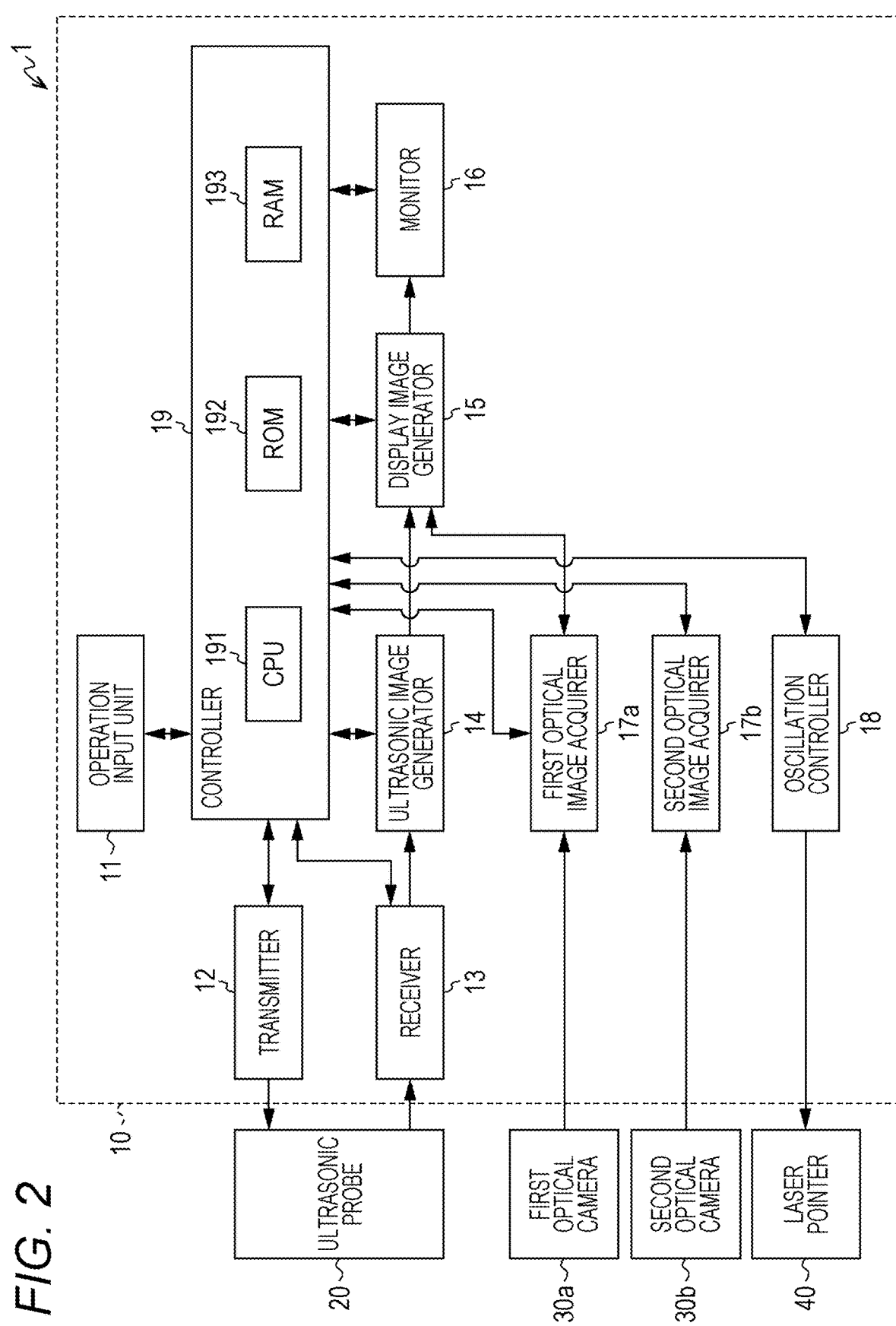
FIG. 2 is a diagram illustrating functional blocks of an ultrasonic diagnostic apparatus main body according to an embodiment of the present invention.

FIG. 1 is a diagram illustrating an overall configuration of an ultrasonic diagnostic apparatus 1 according to the present embodiment. FIG. 2 is a diagram illustrating functional blocks of an ultrasonic diagnostic apparatus main body 10 according to the present embodiment. FIG. 3 is a diagram illustrating a configuration of an ultrasonic probe 20 according to the present embodiment.

The ultrasonic diagnostic apparatus 1 includes the ultrasonic diagnostic apparatus main body 10, the ultrasonic probe 20, a first optical camera 30*a*, a second optical camera 30*b*, and a laser pointer 40. Note that the ultrasonic probe 20, the first optical camera 30*a*, the second optical camera 30*b*, and the laser pointer 40 are connected to the ultrasonic diagnostic apparatus main body 10 via cables 20C, 30*a*C, 30*b*C, and 40C, respectively.

In a puncturing task using the ultrasonic diagnostic apparatus 1 according to the present embodiment, it is assumed that a puncture needle QT is, for example, inserted into a subject HT freehand by a user. The user brings a transmission/reception surface of an ultrasonic beam of the ultrasonic probe 20 in contact with a body surface of the subject HT, then operates the ultrasonic diagnostic apparatus 1 to obtain an ultrasonic image of the inside of the subject HT. Also, the user performs the puncturing task by viewing a monitor 16 to confirm a target position inside the subject HT shown in the ultrasonic image (R1 region in FIG. 1) while grasping a target insertion position and a target posture of the puncture needle QT when the puncture needle QT is inserted into the subject HT from an optical image (R2 region in FIG. 1) acquired by the first optical camera 30*a*.

In particular, in the ultrasonic diagnostic apparatus 1 according to the present embodiment, an insertion angle of the puncture needle QT is detected from images captured by the first optical camera 30*a* and the second optical camera 30*b*, and a guide image R1*a* indicating a predicted arrival position of the puncture needle QT is displayed so as to be superimposed on the ultrasonic image. In addition, in the ultrasonic diagnostic apparatus 1 according to the present embodiment, a tilt angle of the puncture needle QT is detected from the images captured by the first optical camera 30*a* and/or the second optical camera 30*b*, and an indicator image R2e indicating the tilt angle of the puncture needle QT is displayed. As a result, the user can accurately perform the puncturing task while adjusting the insertion angle and the tilt angle of the puncture needle QT and grasping a positional relationship between the predicted arrival position of the puncture needle QT and the target position inside the subject HT (described later with reference to FIG. 8).

Note that the "insertion angle of the puncture needle QT" denotes the insertion angle of the puncture needle QT relative to the body surface of the subject HT in a side view, while the "tilt angle of the puncture needle QT" denotes a direction of the puncture needle QT in a plan view (that is, a visual field from above the body surface of the subject HT).

In the ultrasonic diagnostic apparatus 1 according to the present embodiment, a projection image 40L formed on the body surface of the subject by a laser beam emitted from the laser pointer 40 is displayed in an optical image R2 acquired by the first optical camera 30a. As a result, the user can insert the puncture needle QT into the subject HT such that the tilt angle of the puncture needle QT is not deviated (described later with reference to FIG. 8).

The ultrasonic probe 20 functions as an acoustic sensor that transmits ultrasonic beams (for example, about 1 to 30 MHz) into the subject HT (for example, a human body) and receives an ultrasonic echo reflected inside the subject HT from among the transmitted ultrasonic beams, then converts the ultrasonic echo into an electric signal. Note that while a linear probe is illustrated as an example of the ultrasonic probe 20 in the present embodiment, an arbitrary probe such as a convex probe, a sector probe, or a three-dimensional probe can be applied to the ultrasonic probe 20.

Figure 3:
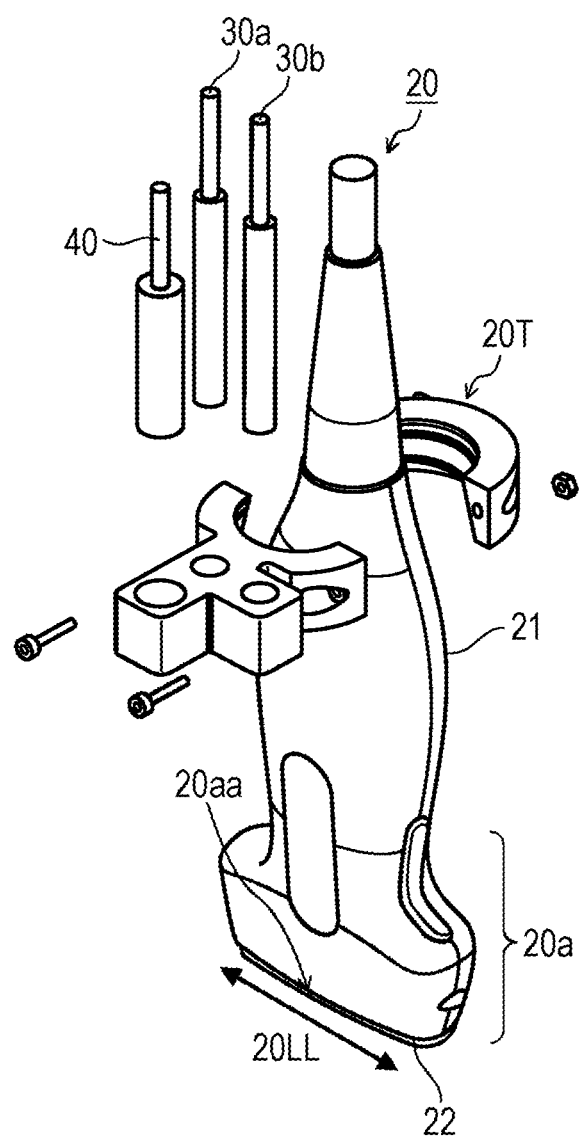
FIG. 3 is a diagram illustrating a configuration of an ultrasonic probe according to an embodiment of the present invention.

The ultrasonic probe 20 includes, for example, a housing 21 and a transducer array 22 disposed at a probe distal end 20a of the housing 21 (see FIG. 3).

The housing 21 has, for example, an elongated shape, and also serves as a gripper that is gripped by the user. An attachment 20T is attached to a proximal end side of the housing 21, and the first optical camera 30a, the second optical camera 30b, and the laser pointer 40 are in a state of being fixed to the housing 21 via the attachment 20T.

The transducer array 22 is disposed to form an ultrasonic transmission/reception surface at the probe distal end 20a of the housing 21. The transducer array 22 includes a plurality of transducers (for example, piezoelectric elements) arranged along a long axis direction (20LL direction in FIG. 3) of the probe distal end 20a of the housing 21. Note that when an ultrasonic image is acquired, by sequentially switching a driving state of each transducer of the transducer array 22 between on/off, ultrasonic scanning is performed in the subject HT along the long axis direction of the probe distal end 20a to generate an ultrasonic image representing a two-dimensional structure in a cross section including a transmission direction of ultrasonic waves (that is, a depth direction of the subject HT) and a scan direction of the ultrasonic waves (that is, the long axis direction of the probe distal end 20a).

The ultrasonic diagnostic apparatus main body 10 includes an operation input unit 11, a transmitter 12, a receiver 13, an ultrasonic image generator 14, a display image generator 15, the monitor 16, a first optical image acquirer 17a, a second optical image acquirer 17b, an oscillation controller 18, and a controller 19.

The operation input unit 11 receives, for example, instructions that instruct the start of diagnosis or the like, or an input of information regarding the subject HT. The operation input unit 11 includes, for example, an operation panel having a plurality of input switches, a keyboard, and a mouse. Note that the operation input unit 11 may include a touch panel provided integrally with the monitor 16.

The transmitter 12 is a transmission device that transmits voltage pulses as a drive signal to the ultrasonic probe 20 in accordance with an instruction from the controller 19. The transmitter 12 includes, for example, a high-frequency pulse oscillator and a pulse setter. The transmitter 12 adjusts the voltage pulses generated by the high-frequency pulse oscillator to a voltage amplitude, a pulse width, and a transmission timing set by the pulse setter to transmit voltage pulses for each channel of the ultrasonic probe 20.

The transmitter 12 includes a pulse setter for each of a plurality of channels of the ultrasonic probe 20, which makes it possible to set the voltage amplitude, the pulse width, and the transmission timing of the voltage pulses for each of the plurality of channels. For example, by setting an appropriate delay time for the plurality of channels, the transmitter 12 changes a target depth and generates different pulse waveforms.

The receiver 13 is a receiver device that processes reception of received signals pertaining to the ultrasonic echoes generated by the ultrasonic probe 20 in accordance with an instruction from the controller 19. The receiver 13 includes, for example, a preamplifier, an AD convertor, and a reception beamformer.

The receiver 13 amplifies received signals pertaining to weak ultrasonic echoes for each channel by the preamplifier and converts the received signals into digital signals by the AD convertor. Also, the receiver 13 combines the received signals of the plurality of channels into one signal by phase regulating and adding the received signals for each channel by the reception beamformer to make acoustic line data.

The ultrasonic image generator 14 acquires the received signals (acoustic line data) from the receiver 13 and generates an ultrasonic image (that is, a tomographic image) of the inside of the subject HT.

When, for example, the ultrasonic probe 20 transmits a pulsed ultrasonic beam in the depth direction, the ultrasonic image generator 14 temporally and continuously accumulates a signal intensity of the ultrasonic echoes detected thereafter in a line memory. Also, the ultrasonic image generator 14 sequentially accumulates the signal intensity of the ultrasonic echoes at each scanning position in the line memory in accordance with the scanning of the inside of the subject HT by the ultrasonic beam from the ultrasonic probe 20 to generate two-dimensional data in units of frames. Then, by converting the signal intensity of the two-dimensional data into a luminance value, the ultrasonic image generator 14 generates an ultrasonic image representing a two-dimensional structure in a cross section including the transmission direction of the ultrasonic waves and the scan direction of the ultrasonic waves.

The display image generator 15 acquires ultrasonic image data from the ultrasonic image generator 14 and acquires optical image data from the first optical image acquirer 17a. Also, the display image generator 15 generates a display image that displays an ultrasonic image and an optical image within the same display screen (see FIG. 6). And, the display image generator 15 transmits the data of the generated display image to the monitor 16. The display image generator 15 updates the display image in real time every time new ultrasonic image data is acquired from the ultrasonic image generator 14 and/or every time new optical image data is acquired from the first optical image acquirer 17a, and displays the display image on the monitor 16 in a dynamic image format.

Note that the display image generator 15 may be capable of changing a display mode of the ultrasonic image and/or the optical image in the display image in accordance with an instruction from the controller 19 (or setting content input to the operation input unit 11).

Alternatively, the display image generator 15 may generate a display image after performing a predetermined image process on the ultrasonic image output from the ultrasonic image generator 14 or the optical image output from the first optical image acquirer 17a.

The monitor 16 includes, for example, a liquid crystal display, an organic EL display, or a CRT display. The monitor 16 acquires the display image data from the display image generator 15 in accordance with an instruction from the controller 19, and displays the display image on the monitor 16 itself.

The first optical image acquirer 17a acquires image signals pertaining to the optical image from the first optical camera 30a, then generates image data pertaining to the optical image. The first optical image acquirer 17a continuously generates image data in units of frames based on, for example, image signals sequentially obtained from the first optical camera 30a, then generates dynamic image data of the optical image. The first optical image acquirer 17a transmits the image data of the generated optical image to the display image generator 15 and the controller 19.

The second optical image acquirer 17b acquires image signals pertaining to the optical image from the second optical camera 30b, then generates image data pertaining to the optical image. The second optical image acquirer 17b continuously generates image data in units of frames based on, for example, image signals sequentially obtained from the second optical camera 30b, then generates dynamic image data of the optical image. The second optical image acquirer 17b transmits the image data of the generated optical image to the controller 19.

Note that the first optical image acquirer 17a may be built into the first optical camera 30a. In addition, the second optical image acquirer 17b may similarly be built into the second optical camera 30b.

The oscillation controller 18 controls a driving current flowing through a laser diode of the laser pointer 40 and controls whether operation of the laser pointer 40 is turned on/off. Note that the oscillation controller 18 operates in accordance with an instruction from the controller 19.

Note that the transmitter 12, the receiver 13, the ultrasonic image generator 14, the display image generator 15, the first optical image acquirer 17a, the second optical image acquirer 17b, and the oscillation controller 18 are formed by a dedicated or general-purpose hardware (electronic circuit) corresponding to each process, such as, for example, a digital signal processor (DSP), an application specific integrated circuit (ASIC), or a programmable logic device (PLD), and implement each function in cooperation with the controller 19.

The controller 19 performs overall control of the ultrasonic diagnostic apparatus 1 by controlling the operation input unit 11, the transmitter 12, the receiver 13, the ultrasonic image generator 14, the display image generator 15, the monitor 16, the first optical image acquirer 17a, the second optical image acquirer 17b, and the oscillation controller 18 in accordance with their respective functions.

The controller 19 includes a central processing unit (CPU) 191 as a processor/controller, a read only memory (ROM) 192 and a random access memory (RAM) 193 as main storages, and the like. Basic programs and basic setting data are stored in the ROM 192. The CPU 191 reads a program corresponding to processed content from the ROM 192 to deploy in the RAM 193, then executes the deployed program, thereby centrally controlling operation of each functional block (the operation input unit 11, the transmitter 12, the receiver 13, the ultrasonic image generator 14, the display image generator 15, the monitor 16, the first optical image acquirer 17a, the second optical image acquirer 17b, and the oscillation controller 18) of the ultrasonic diagnostic apparatus main body 10.

[Detailed Configuration of the First Optical Camera 30a, the Second Optical Camera 30b, and the Laser Pointer 40]

Figure 4:
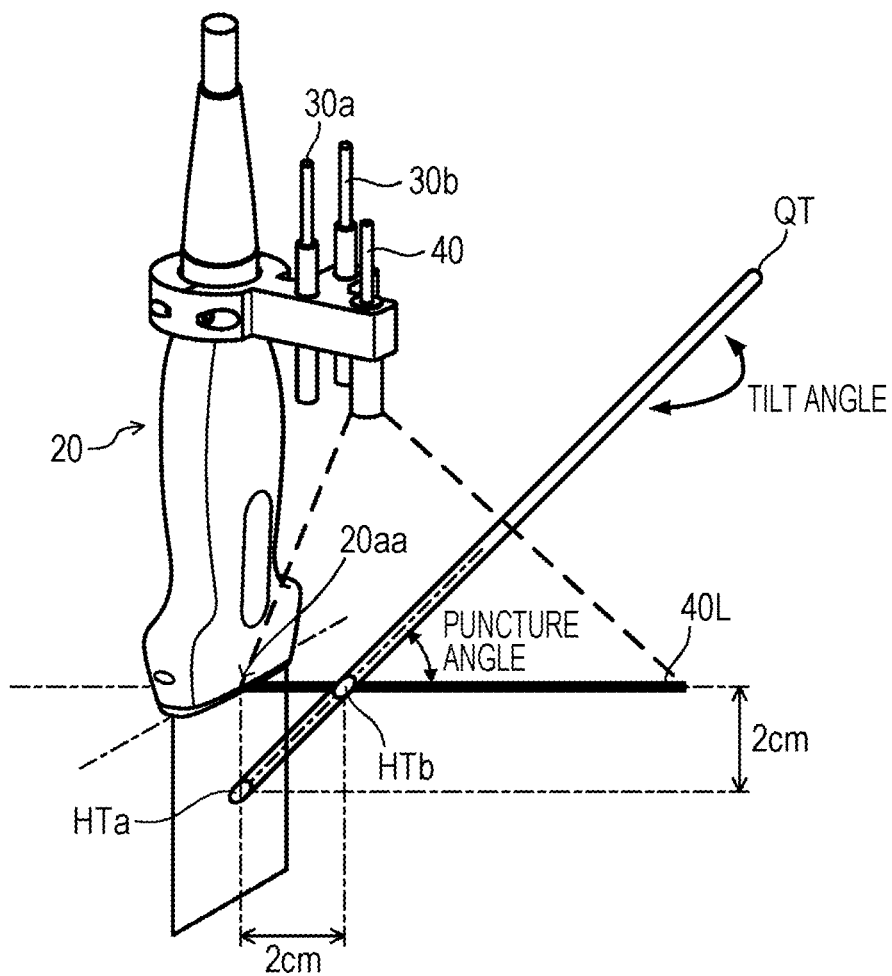
FIG. 4 is a diagram illustrating a positional relationship between a puncture needle and a capture region of a first optical camera, a positional relationship between the puncture needle and a capture region of a second optical camera, and a positional relationship between the puncture needle and a projection image of a laser beam from a laser pointer during a puncturing task.
Figure 5A:
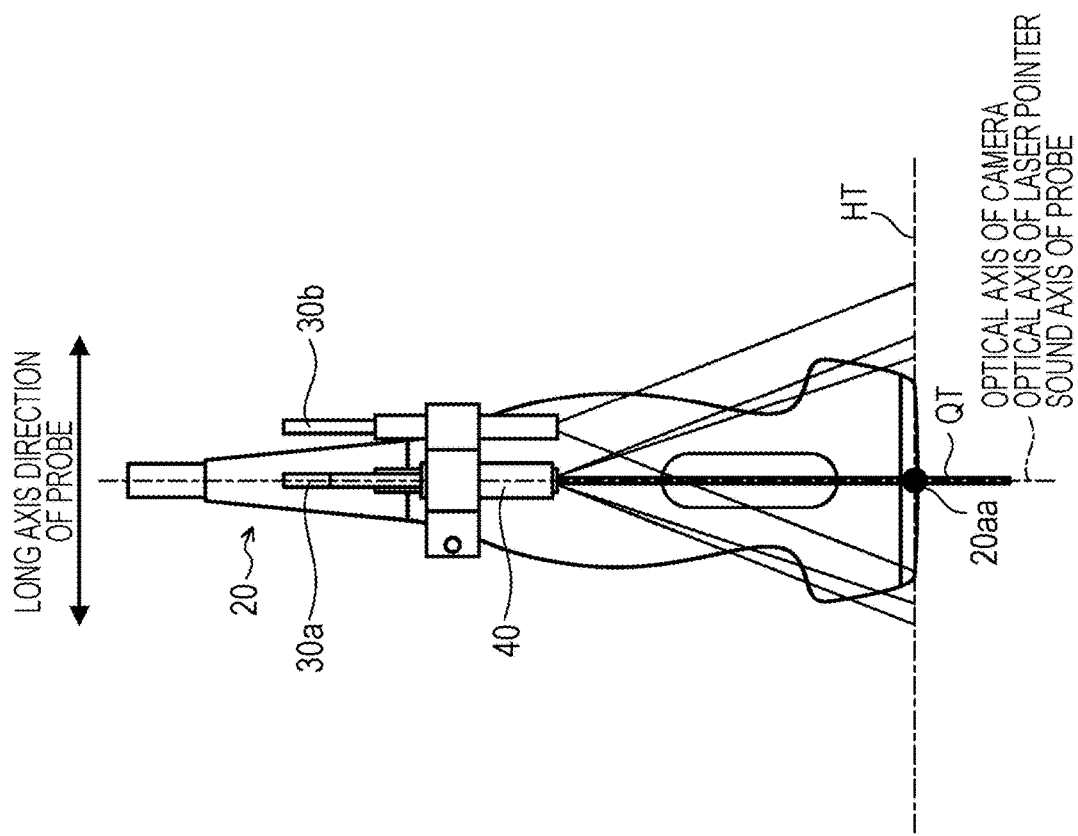
FIGS. 5A and 5B are diagrams illustrating the positional relationship between the puncture needle and the capture region of the first optical camera, the positional relationship between the puncture needle and the capture region of the second optical camera, and the positional relationship between the puncture needle and the projection image of a laser beam of the laser pointer during the puncturing task.
Figure 5B:
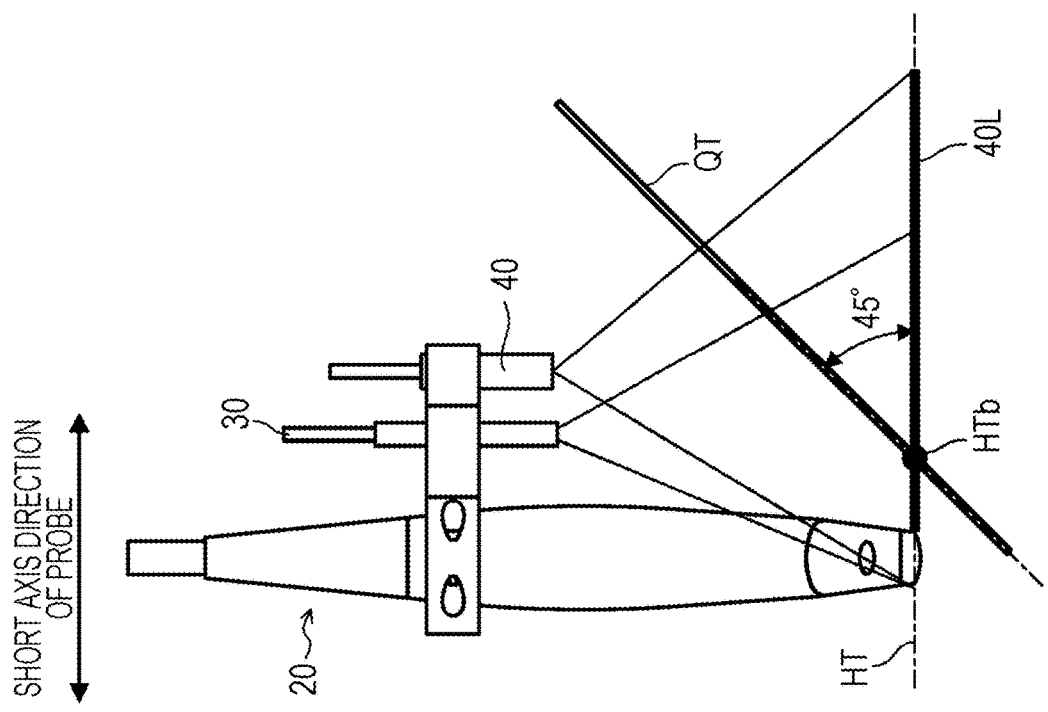

FIG. 4 and FIGS. 5A and 5B are diagrams illustrating the positional relationship between the puncture needle QT and the capture region of the first optical camera 30a, the positional relationship between the puncture needle QT and the capture region of the second optical camera 30b, and the positional relationship between the puncture needle QT and the projection image 40L of the laser beam of the laser pointer 40 during the puncturing task.

FIG. 4 is a perspective view of the ultrasonic probe 20 as viewed obliquely from above, FIG. 5A is a side view of the ultrasonic probe 20 (this refers to a diagram illustrating a short axis side of the ultrasonic probe 20; the same applies hereinafter), and FIG. 5B is a front view of the ultrasonic probe 20 (this refers to a diagram illustrating a long axis side of the ultrasonic probe 20; the same applies hereinafter).

Figure 6:
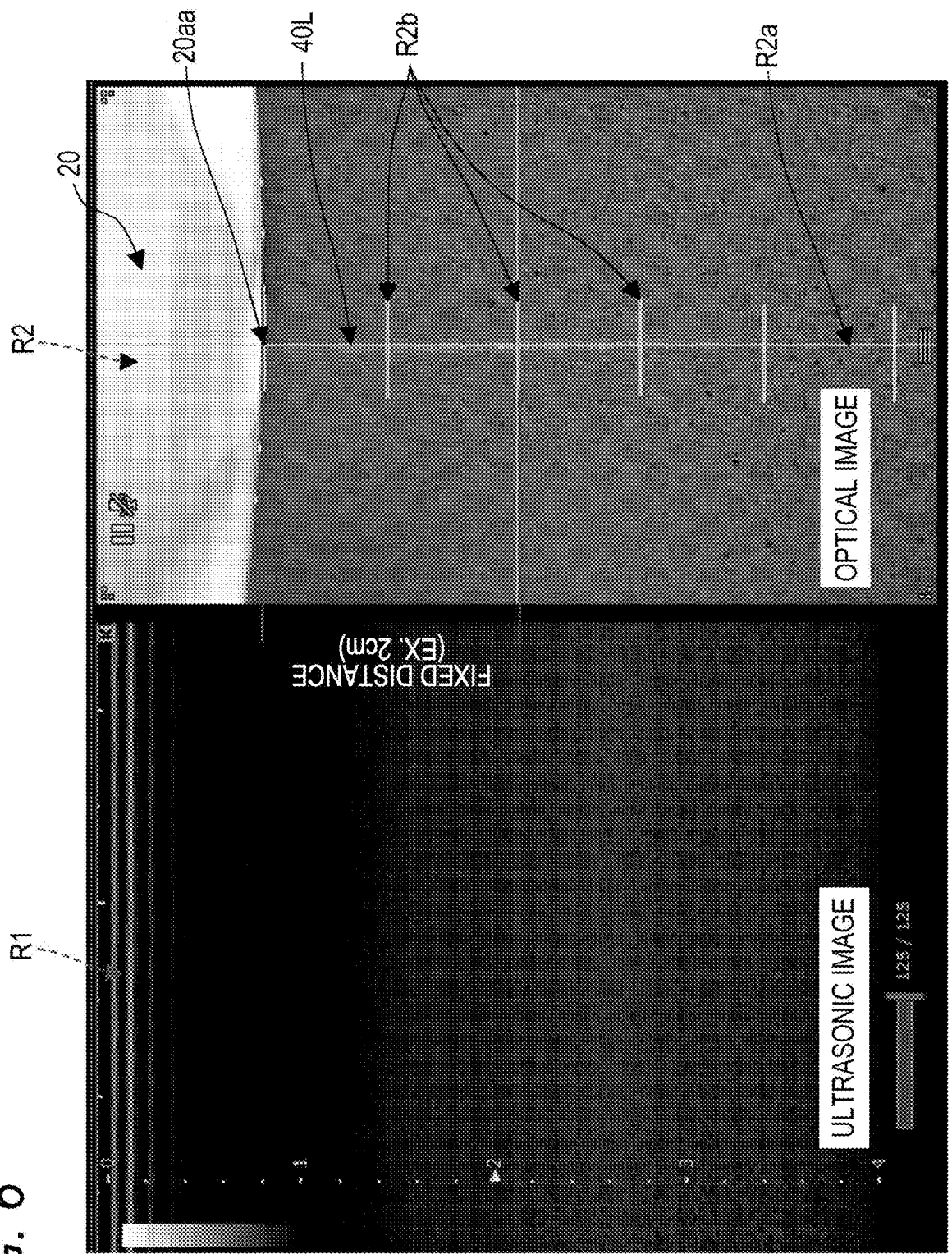
FIG. 6 is a diagram illustrating an example of a monitor screen displayed on a display of the ultrasonic diagnostic apparatus in a guide mode activated during the puncturing task.

FIG. 6 is a diagram illustrating an example of a screen displayed on the monitor 16 of the ultrasonic diagnostic apparatus 1 in a guide mode activated during the puncturing task (hereinafter referred to as a "puncturing task guide mode"). In FIG. 6, an ultrasonic image acquired by the ultrasonic probe 20 is displayed in a left region R1 of a monitor screen, while an optical image generated by the first optical camera 30a is displayed in a right region R2 of the monitor screen. That is, here, the optical image and the ultrasonic image are displayed arrayed on the same monitor 16. Note that FIG. 6 is the monitor screen displayed when the puncture needle QT is in a state of being undetected.

The first optical camera 30a is, for example, a general visible camera that acquires optical images by a built-in image element. By including, for example, a zoom lens, the first optical camera 30a is capable of enlarging and imaging an object to be captured (here, a body surface region of the subject HT).

The first optical camera 30a is attached to a proximal end side of the ultrasonic probe 20 and captures a region near an arrangement position of the probe distal end 20a of the ultrasonic probe 20 on the body surface of the subject HT. Specifically, during the puncturing task, the first optical camera 30a is attached to the ultrasonic probe 20 such that the probe distal end 20a of the ultrasonic probe 20, the projection image 40L formed by projecting the laser beam onto the body surface of the subject HT from the laser pointer 40, and an observation object site of the ultrasonic image of the body surface of the subject HT are shown in the optical image generated by the first optical camera 30a.

As a result, from the optical image displayed on the monitor 16, the user can recognize a relative positional relationship between the probe distal end 20a of the ultrasonic probe 20 on the body surface of the subject HT and an ultrasonic scan cross section (that is, a tomographic plane of the ultrasonic image), and a target insertion position and a target posture of the puncture needle QT on the body surface of the subject HT during the puncturing task (described later with reference to FIG. 6).

The second optical camera 30b is, for example, a general visible camera that acquires optical images by a built-in image element, similar to the first optical camera 30a. By including, for example, a zoom lens, the second optical camera 30b is capable of enlarging and imaging an object to be captured (here, a body surface region of the subject HT).

The second optical camera 30b is, for example, attached to a proximal end side of the ultrasonic probe 20 and captures a region near an arrangement position of the probe distal end 20a of the ultrasonic probe 20 on the body surface of the subject HT, similar to the first optical camera 30a. For example, during the puncturing task, the second optical camera 30b is attached to the ultrasonic probe 20 such that the probe distal end 20a of the ultrasonic probe 20, the projection image 40L formed by projecting the laser beam onto the body surface of the subject HT from the laser pointer 40, and an observation object site of the ultrasonic image of the body surface of the subject HT are shown in a second optical image generated by the second optical camera 30b.

Note that hereinafter, for convenience of description, the optical image generated by the first optical camera 30a is referred to as a "first optical image", while the optical image generated by the second optical camera 30b is referred to as a "second optical image".

Here, since the first optical image generated by the first optical camera 30a is used for the display on the monitor 16, the first optical camera 30a is attached to the proximal end side of the ultrasonic probe 20 such that an optical axis of the first optical camera 30a overlaps a sound axis center of the ultrasonic probe 20 when viewed from the front. Meanwhile, the second optical image acquired by the second optical camera 30b is used together with the first optical image acquired by the first optical camera 30a, and is used only for calculating an insertion angle of the puncture needle QT from a stereo camera principle (described later with reference to FIGS. 8 and 9) during the puncturing task. Therefore, the second optical camera 30b is attached to the proximal end side of the ultrasonic probe 20 such that an optical axis of the second optical camera 30b is parallel to the optical axis of the first optical camera 30a at a position displaced leftward or rightward from the sound axis center of the ultrasonic probe 20 (see FIG. 5B).

The laser pointer 40 is, for example, a general semiconductor laser that outputs a visible color laser beam (for example, a red laser beam having a wavelength of 635 nm to 690 nm). The laser pointer 40 is attached to the proximal end side of the ultrasonic probe 20 and emits the laser beam onto the body surface of the subject HT to form the predetermined projection image 40L, thereby aiding in preventing deviation of a tilt angle of the puncture needle QT when the puncture needle QT is inserted into the subject HT.

The laser pointer 40 outputs the laser beam such that a shape of the projection image 40L from the laser beam (that is, an irradiated shape) on the body surface of the subject HT is linear, by, for example, a built-in diffraction grating or slit on the laser pointer 40. Also, the projection image 40L formed by the laser beam of the laser pointer 40 extends from a start point as a long axis direction (direction 20LL illustrated in FIG. 3) center position 20aa (hereinafter also referred to as a "sound axis center") of the probe distal end 20a of the ultrasonic probe 20 toward a direction orthogonal to the long axis direction (that is, a direction away from the probe distal end 20a) on the body surface of the subject HT.

As a result, it is possible to allow the user to recognize the long axis direction center position 20aa of the probe distal end 20a of the ultrasonic probe 20 and the direction orthogonal to the long axis direction on the body surface of the subject HT.

FIG. 4 and FIGS. 5A and 5B illustrate a relationship between a target site HTa in the subject HT, a target insertion position HTb of the puncture needle QT into the body surface, and a target insertion angle θ of the puncture needle QT into the body surface. For example, as illustrated in FIG. 4, when the target site HTa is present at a position 2 cm from the body surface of the subject HT, the target insertion position HTb of the puncture needle QT is set at a position separated from the long axis direction center position 20aa of the probe distal end 20a by 2 cm, and the target insertion angle θ of the puncture needle QT relative to the body surface of the subject HT is set to 45°. As a result, the puncture needle QT inserted from the body surface advances to the position of the target site HTa in the subject HT. However, the target insertion angle θ of the puncture needle QT relative to the body surface of the subject HT may be an angle other than 45°. In that case, the target insertion position HTb of the puncture needle QT may be set in accordance with the target insertion angle θ of the puncture needle QT.

Note that when the puncturing task is performed under an ultrasonic guide, usually, the ultrasonic probe is first operated by being moved on the body surface of the subject HT by the user such that the target site (that is, the puncture object site) HTa in the subject HT comes to the center position (that is, the long axis direction center position 20aa of the probe distal end 20a of the ultrasonic probe 20) in a scan direction of an ultrasonic image R1. Also, during the puncturing task, the puncture needle QT is in a state in which the tilt angle is adjusted to zero degrees (that is, a state in which an extension direction of the puncture needle QT is orthogonal to the long axis direction of the probe distal end 20a of the ultrasonic probe 20).

The first optical camera 30a and the laser pointer 40 are set such that the sound axis center of the ultrasonic probe 20, the optical axis of the first optical camera 30a, and the optical axis of the laser pointer 40 coincide when viewed from the front (see FIG. 5B). In other words, the optical axis of the first optical camera 30a and the sound axis center of the ultrasonic probe 20 are set such that each overlap a central axis of the projection image 40L of the laser beam output from the laser pointer 40 when projected onto the body surface of the subject HT. As a result, the projection image 40L of the laser beam projected onto the body surface of the subject HT indicates the direction orthogonal to the long axis direction, with the long axis direction center position 20aa of the probe distal end 20a of the ultrasonic probe 20 as the start point.

In addition, the second optical camera 30b is attached to the proximal end side of the ultrasonic probe 20 such that the optical axis of the second optical camera 30b is parallel to the optical axis of the first optical camera 30a. As a result, according to the stereo camera principle, the distances of each position of the puncture needle QT can be obtained using the first optical camera 30a and the second optical camera 30b, and the insertion angle of the puncture needle QT relative to the body surface of the subject HT can be obtained. However, the optical axes of the first optical camera 30a and the second optical camera 30b do not need to be parallel to an extension direction of the housing 21 of the ultrasonic probe 20 (that is, a vertical direction).

Note that in the ultrasonic diagnostic apparatus 1 according to the present embodiment, the first optical camera 30a, the second optical camera 30b, and the laser pointer 40 are attached to the housing 21 of the ultrasonic probe 20 via a detachable attachment 20T so as to form a predetermined positional relationship relative to the ultrasonic probe 20, as described above (see FIG. 3). The positional relationship of the first optical camera 30a, the second optical camera 30b, and the laser pointer 40 relative to the ultrasonic probe 20 is determined by the attachment 20T.

When a puncturing task support mode is activated, as illustrated in FIG. 6, for example, the display image generator 15 generates a display image in which the ultrasonic image R1 acquired by the ultrasonic probe 20 and a first optical image R2 generated by the first optical camera 30a (that is, the first optical image R2 in which the body surface of the observation object site of the subject HT is enlarged) are arrayed left to right within the same screen of the monitor 16 (that is, within the display image).

In addition, at this time, for example, as illustrated in FIG. 6, the display image generator 15 superimposes and displays an imaginary vertical line R2a indicating a line of the optical axis of the first optical camera 30a and horizontal imaginary lines R2b indicating lines orthogonal to the optical axis of the first optical camera 30a in the optical image R2 of the display image. The imaginary vertical line R2a and the horizontal imaginary lines R2b guide the target posture and the target insertion position of the puncture needle QT together with the projection image 40L formed by the laser beam of the laser pointer 40.

Specifically, the imaginary vertical line R2a functions so as to allow the user to recognize the long axis direction center position 20aa of the probe distal end 20a, and angular deviation (that is, a tilt angle) during insertion of the puncture needle QT. In addition, the horizontal imaginary lines R2b function so as to allow the user to recognize the distance of the insertion position of the puncture needle QT from the probe distal end 20a. FIG. 6 illustrates an aspect in which the horizontal imaginary lines R2b are displayed at positions 1 cm, 2 cm, 3 cm, 4 cm, and 5 cm from the probe distal end 20a. Note that the distance from the probe distal end 20a in the first optical image R2 is specified in advance from a state in which the cameras 30 are held in the attachment 20T.

Note that display control of the display image generator 15 in the puncturing task support mode is performed by the controller 19 (a display controller 19d to be described later).

[Operation in Puncturing Task Guide Mode]

Next, operation of the ultrasonic diagnostic apparatus 1 according to the present embodiment in the puncturing task guide mode is described.

Figure 7:
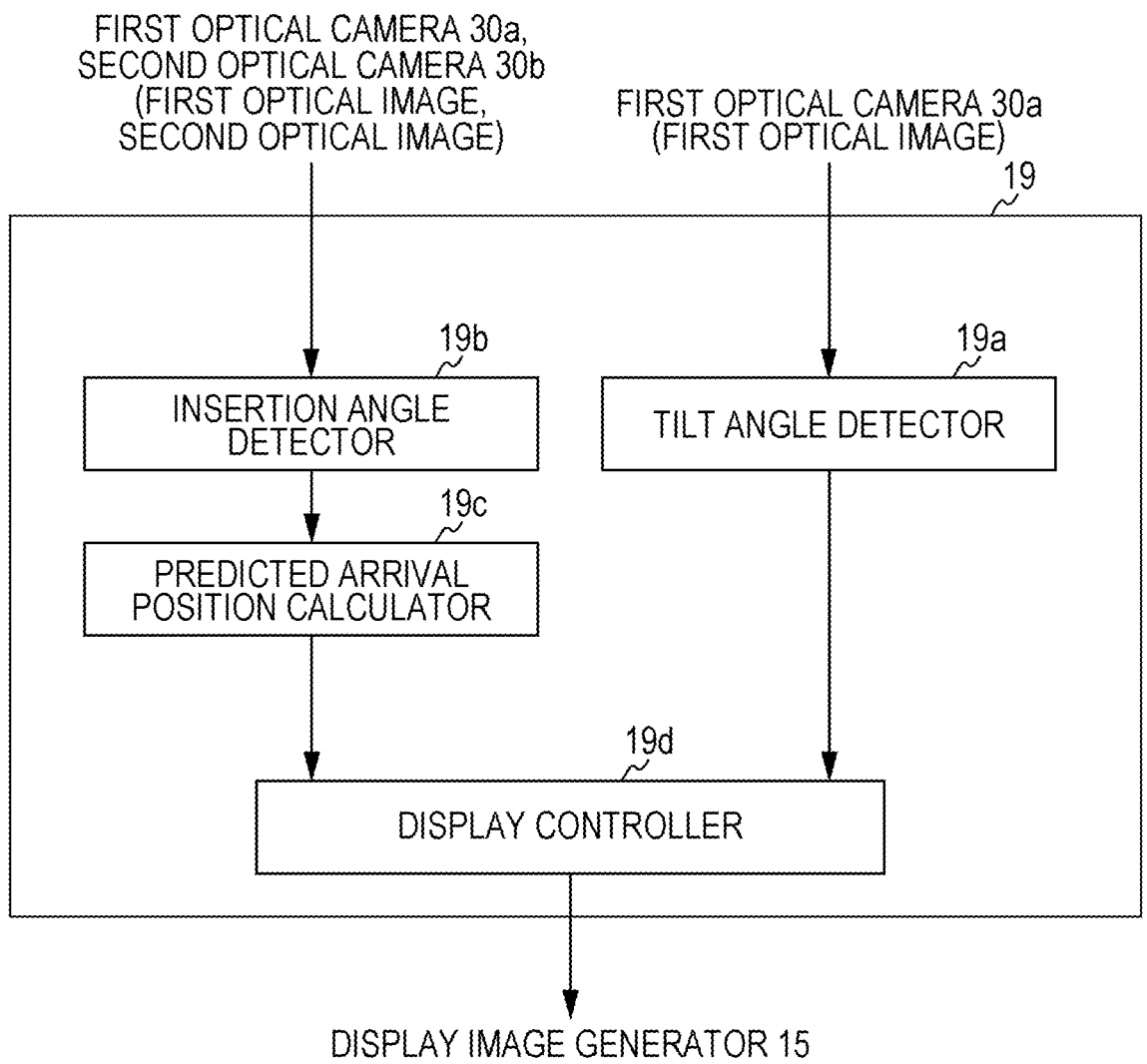
FIG. 7 is a diagram illustrating an example of functional blocks included in a controller.

FIG. 7 is a diagram illustrating an example of functional blocks included in the controller 19.

Figure 8:
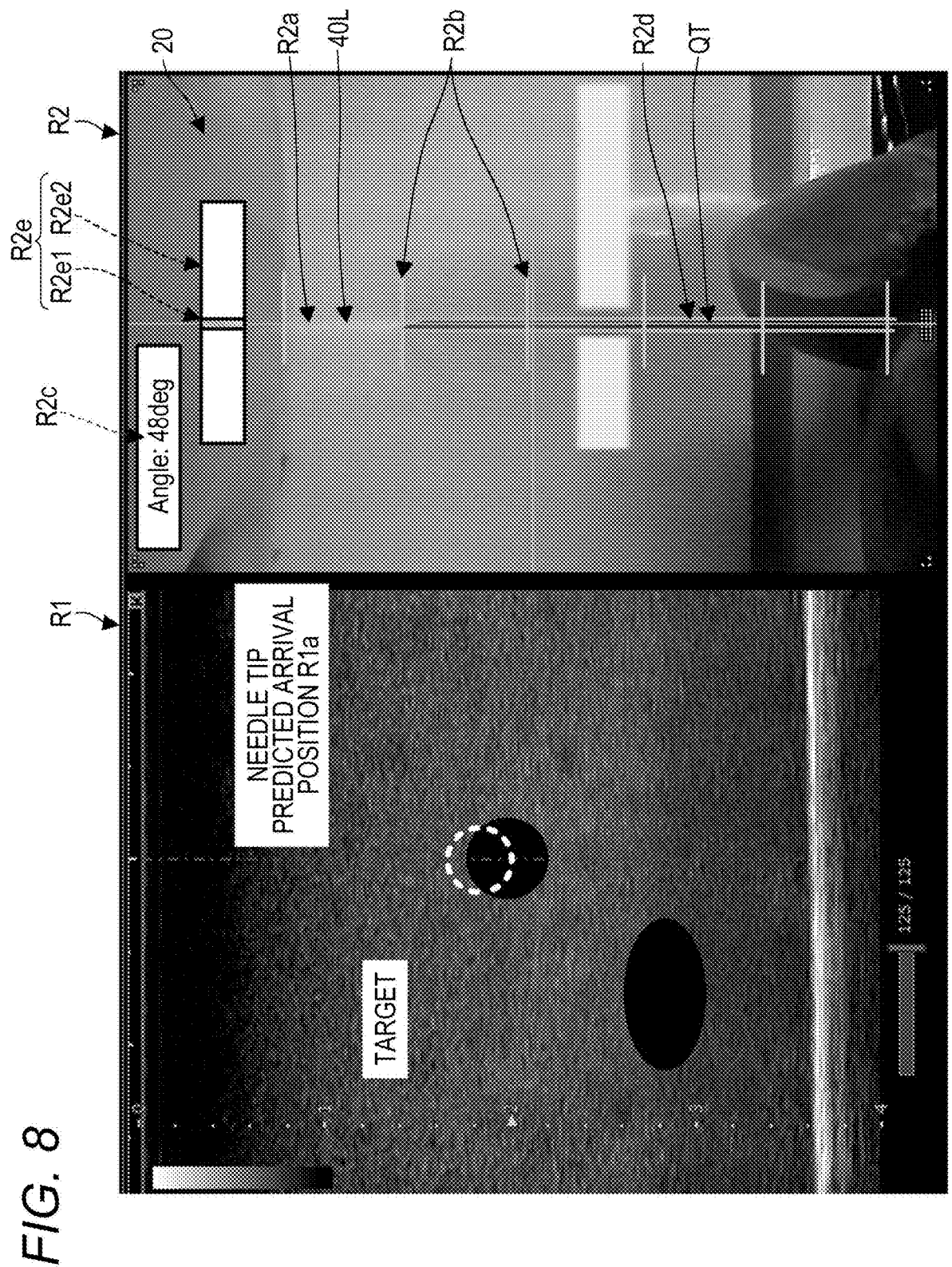
FIG. 8 is a diagram illustrating an example of the monitor screen displayed on the display of the ultrasonic diagnostic apparatus when the puncture needle is detected in the puncturing task guide mode.
Figure 9:
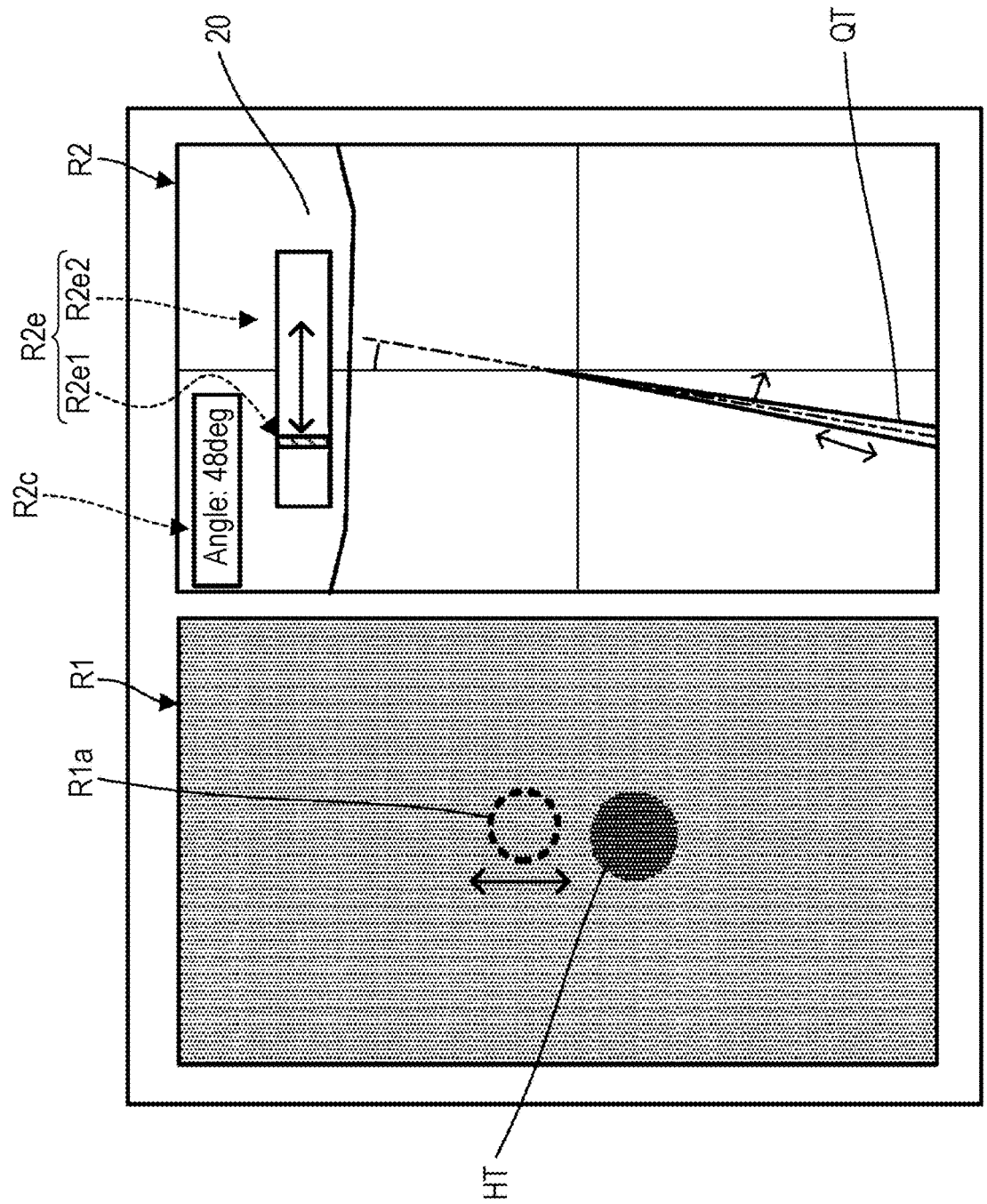
FIG. 9 is a diagram schematically illustrating a predicted arrival position guide image and an indicator image illustrated in FIG. 8.

FIG. 8 is a diagram illustrating an example of a screen displayed on the monitor 16 of the ultrasonic diagnostic apparatus 1 when the puncture needle QT is detected in the puncturing task guide mode. FIG. 9 is a diagram schematically illustrating a predicted arrival position guide image R1a and the indicator image R2e illustrated in FIG. 8.

The controller 19 includes a tilt angle detector 19a, an insertion angle detector 19b, a predicted arrival position calculator 19c, and the display controller 19d, and performs display control in the puncturing task guide mode.

The tilt angle detector 19a detects a tilt angle of the puncture needle QT relative to the central axis of the ultrasonic probe 20 by performing image analysis on the first optical image.

Figure 10:
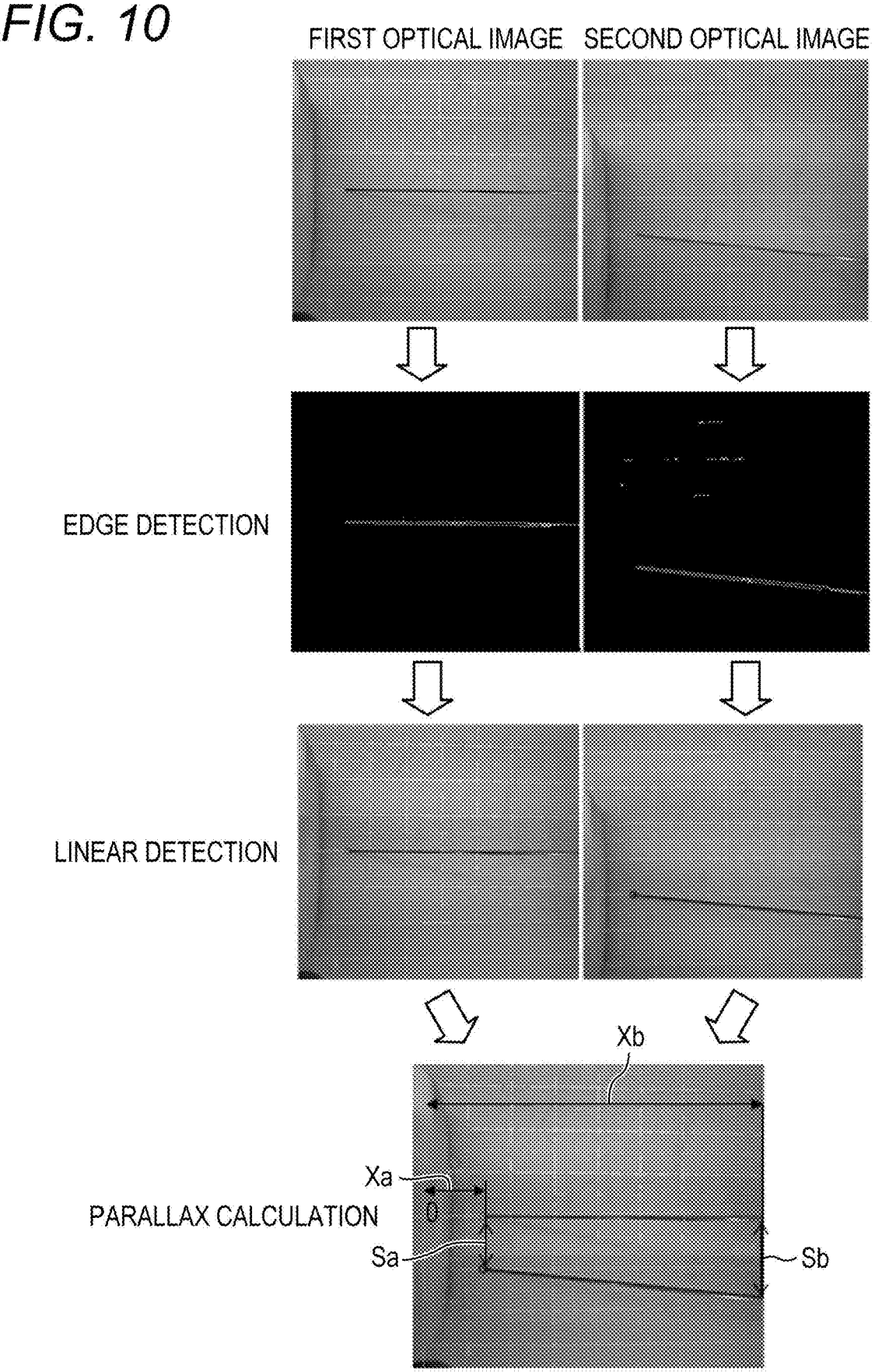
FIG. 10 is a diagram describing a detection process of an insertion angle of the puncture needle by an insertion angle detector.

The tilt angle detector 19a detects, for example, the puncture needle QT and the extension direction of the puncture needle QT by performing a linear detection process after performing an edge detection process on the first optical image (similar to a method shown in FIG. 10). Also, the tilt angle detector 19a calculates a current tilt angle of the puncture needle QT from an angle between the direction orthogonal to the long axis direction (direction 20LL illustrated in FIG. 3) of the probe distal end 20a of the ultrasonic probe 20 (that is, the imaginary vertical line R2a in FIG. 8) and the extension direction of the puncture needle QT shown in the first optical image.

However, the tilt angle detector 19a may detect the puncture needle QT from the first optical image and detect the extension direction of the puncture needle QT by conventionally known pattern recognition.

As described above, during the puncturing task, the puncture needle QT preferably punctures an inside of the subject HT along the direction orthogonal to the long axis direction (direction 20LL illustrated in FIG. 3) of the probe distal end 20a of the ultrasonic probe 20. From such a viewpoint, the display controller 19d displays the tilt angle of the puncture needle QT detected by the tilt angle detector 19a on the monitor 16 using the indicator image R2e in order to assist the puncturing task of the user (see FIG. 8).

The indicator image R2e is an image for allowing a deviation angle of the tilt angle of the puncture needle QT to be recognized from the state of a zero-degree tilt angle of the puncture needle QT (the direction orthogonal to the long axis direction of the probe distal end 20a of the ultrasonic probe 20), and, for example, as illustrated in FIG. 8, displaying an indication mark R2e1 at a position corresponding to a current tilt angle of the puncture needle QT on a bar image R2e2 extending in a lateral direction, and expressing the tilt angle of the puncture needle QT from −30 degrees to +30 degrees from a left end to a right end, allows the tilt angle of the current puncture needle QT to be recognized.

Note that the display controller 19d may change a color of the indicator image R2e in accordance with a magnitude of the tilt angle of the puncture needle QT (that is, the tilt angle) in order to allow the user to recognize an amount that the tilt angle of the puncture needle QT has deviated.

The insertion angle detector 19b performs image analysis on the first optical image generated by the first optical camera 30a and the second optical image generated by the second optical camera 30b, and detects the insertion angle of the puncture needle QT relative to the body surface of the subject HT using the stereo camera principle. Note that the second optical camera 30b is installed such that the optical axis of the second optical camera 30b is parallel to the optical axis of the first optical camera 30a. As a result, a parallax of each point of the puncture needle QT can be calculated from the first optical image and the second optical image, and distances in a depth direction of each point of the puncture needle QT can be calculated by the stereo camera principle. The insertion angle of the puncture needle QT relative to the body surface can be calculated from the distances in the depth direction of each point of the puncture needle QT.

Figure 11A:
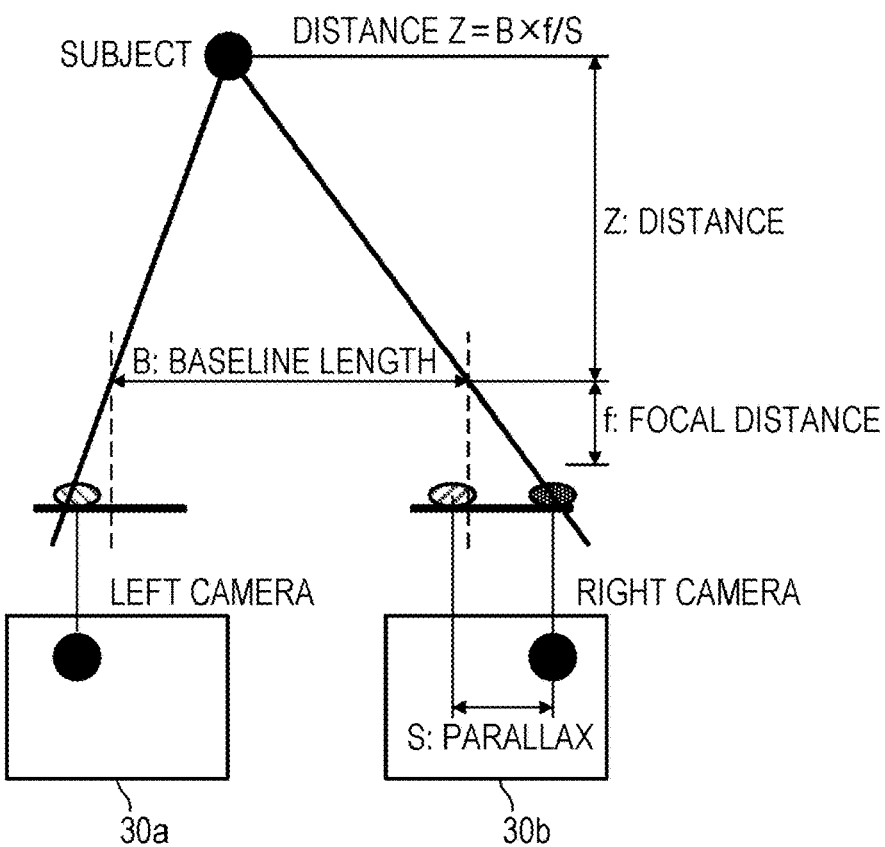
FIGS. 11A and 11B are diagrams describing the detection process of the insertion angle of the puncture needle by the insertion angle detector.
Figure 11B:
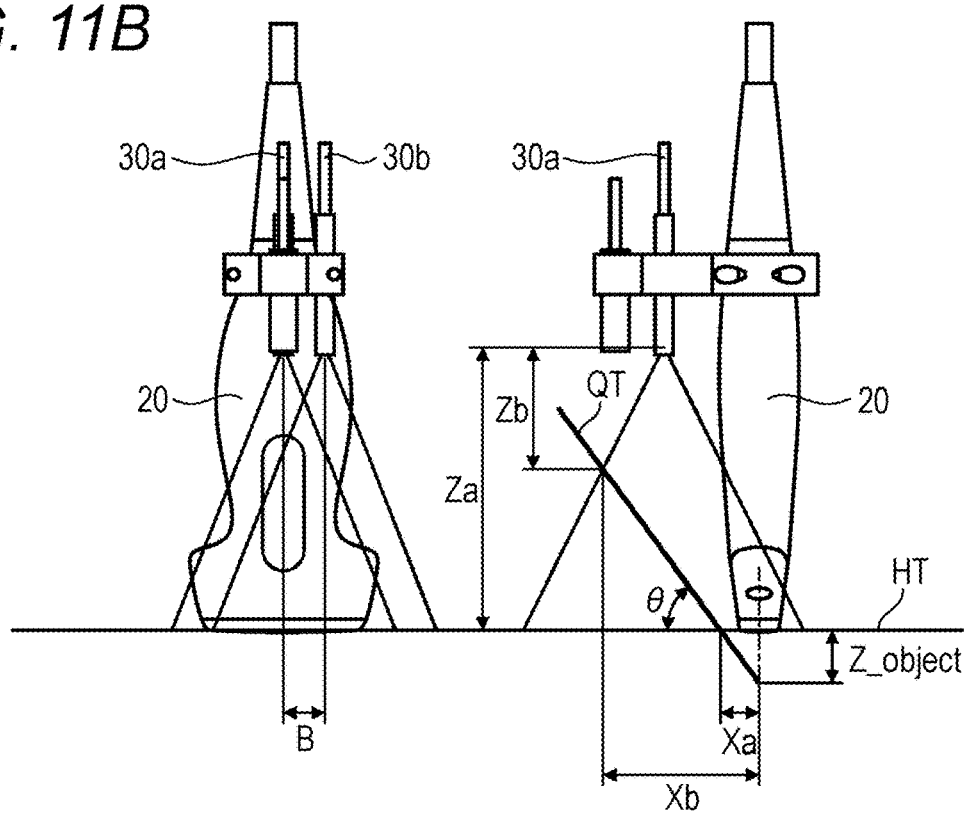

FIGS. 10, 11A, and 11B are diagrams describing an example of a process of detecting the insertion angle of the puncture needle QT by the insertion angle detector 19b.

Specifically, the insertion angle detector 19b first detects the puncture needle QT from each of the first optical image and the second optical image. As an example of a method of detecting the puncture needle QT by the insertion angle detector 19b, there is a method in which a straight line detection process is performed after an edge detection process is performed on each of the first optical image and the second optical image. However, the insertion angle detector 19b may detect the puncture needle QT from each of the first optical image and the second optical image by conventionally known pattern recognition.

Next, the insertion angle detector 19b specifies coordinates of a first representative point (for example, a distal end position) of the puncture needle QT shown in the first optical image, specifies coordinates of the first representative point (for example, the distal end position) of the puncture needle QT shown in the second optical image, and calculates a parallax Sa of the first representative point (for example, the distal end position) of the puncture needle QT between the images. In addition, the insertion angle detector 19b specifies coordinates of a second representative point (for example, an image end position in the first optical image of the puncture needle QT) of the puncture needle QT shown in the first optical image, specifies coordinates of the second representative point (for example, the image end position in the second optical image of the puncture needle QT) of the puncture needle QT shown in the second optical image, and calculates a parallax Sb of the second representative point (for example, the image end position of the puncture needle QT) of the puncture needle QT between the images.

At this time, a distance Za from the first optical camera 30a to the first representative point (for example, the distal end position) of the puncture needle QT can be calculated from the stereo camera principle as the following formula (1).

$$Za = (B \times f)/Sa \quad \text{Formula (1)}$$

(Where Za is a distance from the first optical camera 30a to the first representative point of the puncture needle QT, Sa is a parallax of the first representative point of the puncture needle QT between the images, B is a baseline length (inter-camera distance), and f is a focal distance of lenses of the first optical camera 30a and the second optical camera 30b.)

In addition, a distance Zb from the first optical camera 30a to the second representative point (for example, the image end position of the puncture needle QT) of the puncture needle QT can be similarly calculated from the stereo camera principle as the following formula (2).

$$Zb = (B \times f)/Sb \quad \text{Formula (2)}$$

(Where Zb is a distance from the first optical camera 30a to the second representative point of the puncture needle QT, Sb is a parallax of the second representative point of the puncture needle QT between the images, B is the baseline length (inter-camera distance), and f is the focal distance of the lenses of the first optical camera 30a and the second optical camera 30b.)

In addition, at this time, a distance Xa from the probe distal end 20a of the ultrasonic probe 20 to the first representative point of the puncture needle QT in a plan view can be detected on the first optical image. Furthermore, a distance Xb from the probe distal end 20a of the ultrasonic probe 20 to the second representative point of the puncture needle QT in a plan view can be similarly detected on the first optical image.

As a result, the insertion angle θ of the puncture needle QT can be calculated as the following formula (3).

$$\tan(\theta) = (Za - Zb)/(Xb - Xa) \quad \text{Formula (3)}$$

(Where θ is the insertion angle of the puncture needle QT relative to the body surface of the subject HT, Xa is the distance from the probe distal end 20a of the ultrasonic probe 20 to the first representative point of the puncture needle QT, and Xb is the distance from the probe distal end 20a of the ultrasonic probe 20 to the second representative point of the puncture needle QT.)

As described above, the insertion angle detector 19b calculates the insertion angle of the puncture needle QT relative to the body surface of the subject HT using formula (1), formula (2), and formula (3).

The predicted arrival position calculator 19c calculates a predicted arrival position of the puncture needle QT based on the insertion angle of the puncture needle QT detected in the insertion angle detector 19b. Note that the "predicted arrival position of the puncture needle QT" refers to a predicted position at which the puncture needle QT arrives after having advanced to a region immediately below the ultrasonic probe 20 in the subject HT.

The predicted arrival position calculator 19c calculates the predicted arrival position of the puncture needle QT by, for example, the following formula (4).

$$Z_{object} = Xa \times \tan(\theta) \quad \text{Formula (4)}$$

(Where $Z_{object}$ is the predicted arrival position of the puncture needle QT, and is a depth from the body surface of subject HT.)

As described above, during the puncturing task, in order for the puncture needle QT to puncture a predetermined target in the subject HT, it is necessary for the insertion angle of the puncture needle QT to be appropriate, and when the insertion angle of the puncture needle QT is inappropriate, it is necessary to allow the user to recognize that the insertion angle of the puncture needle QT is inappropriate. From such a viewpoint, based on the predicted arrival position calculated in the predicted arrival position calculator 19c, the display controller 19d displays the guide image R1a indicating the predicted arrival position on the monitor 16 so as to be superimposed on the ultrasonic image (see FIG. 8).

The "guide image R1a indicating the predicted arrival position" (hereinafter also referred to as a "predicted arrival position guide image R1a") is an image for allowing the user to recognize a predicted arrival position when the puncture needle QT advances to the region immediately below the ultrasonic probe 20 in the subject HT. For example, as in FIG. 8, the "predicted arrival position guide image R1a" may add a circular image to the predicted arrival position of the puncture needle QT, or may indicate the predicted arrival position of the puncture needle QT by other characters or patterns.

As a result, the user can recognize, on the monitor 16, a tissue position to be punctured by the distal end of the puncture needle QT in advance. That is, as a result, since the user can perform the puncturing task while adjusting the insertion angle of the puncture needle QT so as to match the predicted position of the distal end of the puncture needle QT with the puncture object tissue site, a puncture target can be easily punctured.

The display controller 19d controls a display image of the display image generator 15 based on the calculation results and detection results of the tilt angle detector 19a, the insertion angle detector 19b, the predicted arrival position calculator 19c, and the like. In the above description, the predicted arrival position guide image R1a and the indicator image R2e have been described as an example of an image whose display is controlled by the display controller 19d, however, the display controller 19d may display an image for assisting the puncturing task of the user.

For example, in the puncturing task guide mode, the display controller 19d may add an edge-enhanced image R2d so as to highlight an edge of the puncture needle QT in the first optical image displayed on the monitor 16 (see FIG.

8). As a result, it is possible to allow the user to clearly recognize the existent position of the puncture needle QT.

In addition, the display controller 19*d* may, for example, display an indicator image R2*c* indicating the insertion angle of the puncture needle QT detected by the insertion angle detector 19*b* on the monitor 16 (see FIG. 8). As a result, it is possible to allow the user to clearly recognize a current insertion angle of the puncture needle QT.

Figure 12:
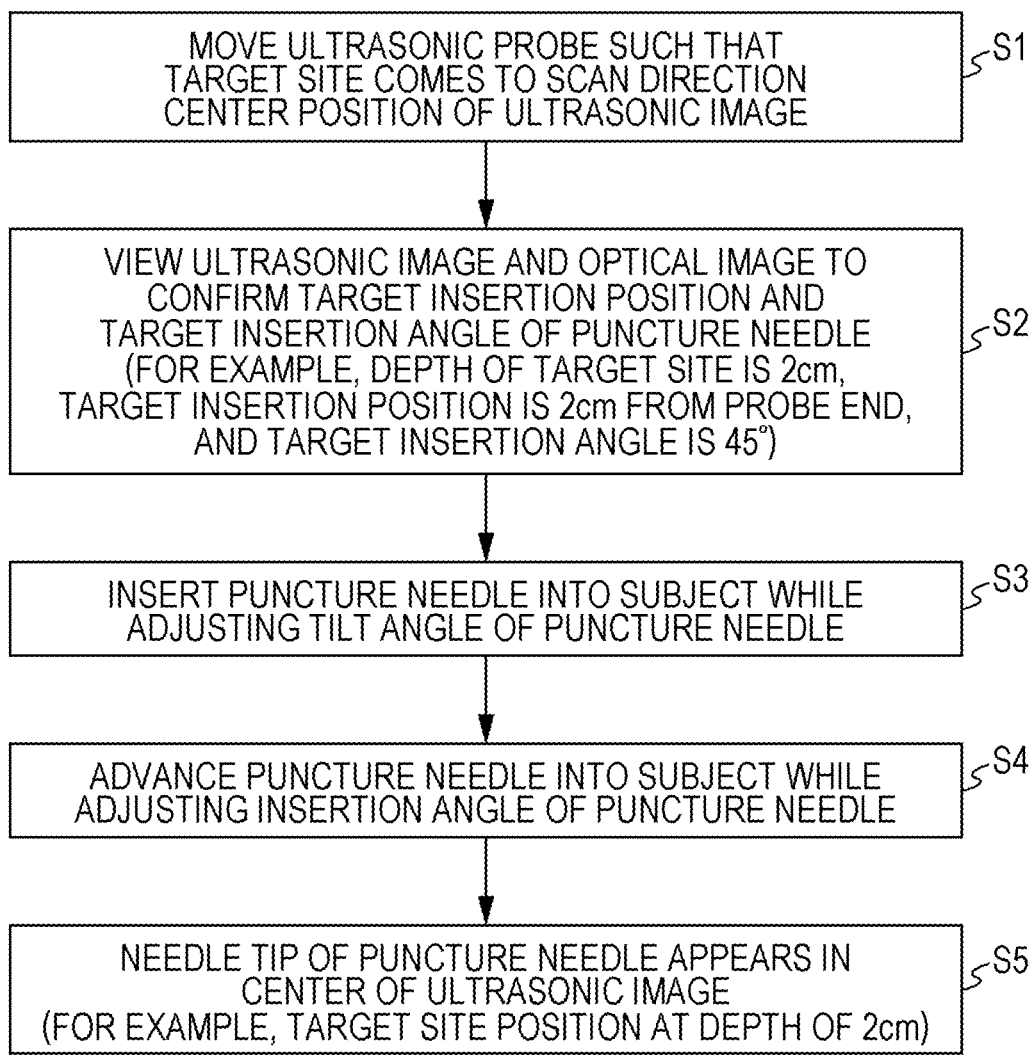
FIG. 12 is a diagram describing a puncturing task of a user when the puncture needle is inserted into a body surface of a subject using the ultrasonic diagnostic apparatus.

FIG. 12 is a diagram describing a puncturing task of the user when the puncture needle QT is inserted into the body surface of the subject HT using the ultrasonic diagnostic apparatus 1.

Note that FIG. 12 illustrates tasks or operations sequentially executed by the user during the puncturing task. The tasks or operations illustrated in FIG. 12 are performed in a state in which the cameras 30 and the laser pointer 40 are set such that the sound axis center of the ultrasonic probe 20, the optical axes of the cameras 30, and the optical axis of the laser pointer 40 coincide when viewed from the front (see FIGS. 5A and 5B). At this time, the user may view the optical image R2 displayed on the monitor 16 to check whether or not the setting is complete by checking whether or not the imaginary vertical line R2*a*, the linear laser beam projection image 40L of the laser pointer 40 formed on the body surface of the subject HT, and a marker (not illustrated) attached to the long axis direction center position 20*aa* of the probe distal end 20*a* overlap each other.

First, after activating the puncturing task guide mode in the ultrasonic diagnostic apparatus 1, the user moves the ultrasonic probe 20 while viewing the ultrasonic image R1 displayed on the monitor 16 such that the puncture object target site HTa in the subject HT comes to the scan direction center position of the ultrasonic image R1 (that is, the long axis direction center position 20*aa* of the probe distal end 20*a*) (step S1).

Next, the user views the ultrasonic image R1 and the optical image R2 (the first optical image) displayed on the monitor 16 to check the target insertion position and the target insertion angle of the puncture needle QT (for example, the depth of the target site is 2 cm, the target insertion position is 2 cm from the probe end, and the target insertion angle is 45°) (step S2).

Next, while viewing the imaginary vertical line R2*a* of the optical image R2 (the first optical image) (or the projection image 40L of the laser beam), the user inserts the puncture needle QT into the subject HT from the target insertion position on the body surface of the subject HT while adjusting the tilt angle of the puncture needle QT (step S3).

Note that, at this time, the user may, for example, confirm the target insertion position of the puncture needle QT (a position 2 cm from the long axis direction center position 20*aa* of the probe distal end 20*a*) in the optical image R2 with the position of the horizontal imaginary line R2*b* superimposed and displayed in the optical image R2 as a reference. Alternatively, by comparing the ultrasonic image R1 with the optical image R2, the target insertion position may be checked to ensure that the distance from the probe distal end 20*a* on the ultrasonic image R1 to the target site HTa and the distance from the probe distal end 20*a* on the optical image R2 to the target insertion position are the same.

Next, the user views the ultrasonic image R1 on the monitor 16 to advance the puncture needle QT into the subject HT while adjusting the insertion angle such that the predicted arrival position guide image R1*a* of the puncture needle QT displayed on the ultrasonic image R1 overlaps the target site shown in the ultrasonic image R1 (step S4).

Due to the above tasks and operations, the puncture needle QT arrives at the position of the target site HTa in the subject HT without requiring adjustment during puncturing. Also, the user confirms that the distal end of the puncture needle QT appears at the position of the target site HTa (here, a position at a depth of 2 cm from the body surface of the subject HT) in the ultrasonic image R1 to complete the puncturing task (step S5). Note that the distal end of the puncture needle QT normally appears as a bright white spot in the ultrasonic image R1.

Effects

As described above, the ultrasonic diagnostic apparatus 1 according to the present embodiment includes the ultrasonic probe 20 that acquires an ultrasonic image of the inside of the subject HT by transmitting and receiving ultrasonic waves; the first capture part 30*a* and the second capture part 30*b* that are attached to the ultrasonic probe 20 and capture the puncture needle QT at an insertion task; the insertion angle detector 19*b* that performs image analysis on the first captured image generated by the first capture part 30*a* and the second captured image generated by the second capture part 30*b*, and detects an insertion angle of the puncture needle QT relative to the body surface of the subject HT using the stereo camera principle; the predicted arrival position calculator 19*c* that calculates a predicted arrival position of the puncture needle QT from the insertion angle; and the display controller 19*d* that displays a guide image indicating the predicted arrival position on the monitor 16 so as to be superimposed on the ultrasonic image.

Therefore, according to the ultrasonic diagnostic apparatus 1 according to the present embodiment, even when the user performs the task of inserting the puncture needle QT into the subject HT freehand, it is possible to support the user such that the puncture needle QT can be accurately inserted into the target site HTa in the subject HT without relying on intuition.

In particular, the ultrasonic diagnostic apparatus 1 according to the present embodiment can allow the user to recognize, on the monitor 16, a tissue position to be punctured by the distal end of the puncture needle QT in advance. That is, since the user can perform the puncturing task while adjusting the insertion angle of the puncture needle QT so as to match the predicted arrival position of the distal end of the puncture needle QT with the puncture object tissue site, the user can easily puncture the puncture target.

Second Embodiment

Figure 13:
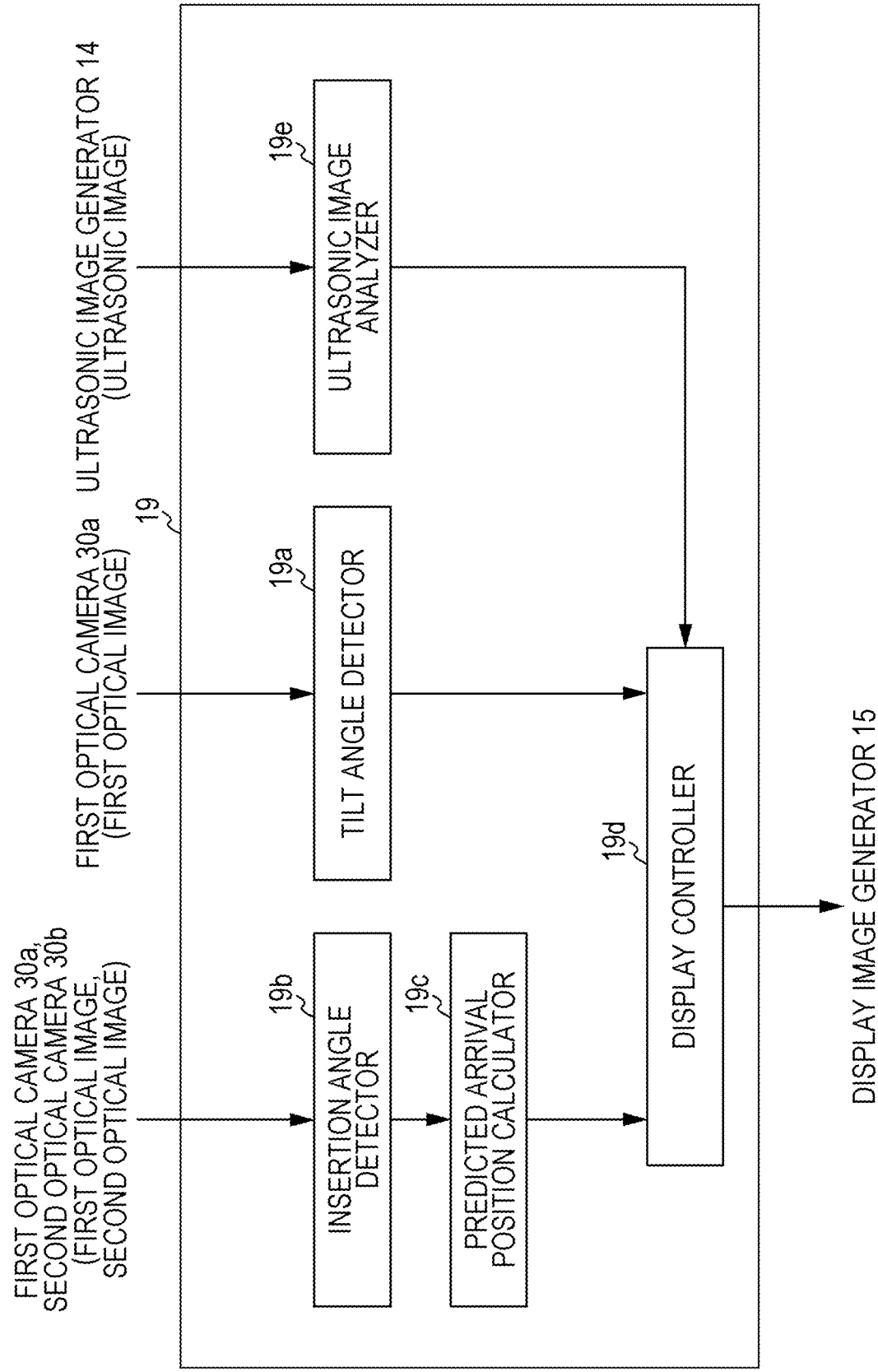
FIG. 13 is a diagram illustrating an example of a configuration of a controller of the ultrasonic diagnostic apparatus according to a second embodiment.

FIG. 13 is a diagram illustrating an example of a configuration of the controller 19 of the ultrasonic diagnostic apparatus 1 according to the second embodiment.

The controller 19 according to the present embodiment differs from the controller 19 according to the first embodiment by further including an ultrasonic image analyzer 19*e* that performs image analysis on a dynamic image of ultrasonic images sequentially generated in the ultrasonic probe 20 to detect that a state is reached in which the distal end of the puncture needle QT is shown in the ultrasonic images, and when the ultrasonic image analyzer 19*e* detects that the state is reached, the display controller 19*d* (corresponding to a notifier) notifies that fact. Note that descriptions of configurations in common with the first embodiment are omitted (hereinafter, the same applies to other embodiments).

Since the puncturing task is performed by an intersecting method (right diagram of FIG. 20), when the user pushes the puncture needle QT into the subject HT, the distal end of the puncture needle QT suddenly appears in the ultrasonic image R1 of the monitor 16. Therefore, depending on the user, the user may push the puncture needle QT more than necessary without noticing that the puncture needle QT has advanced to the region immediately below the ultrasonic probe 20 in the subject HT, thereby damaging the tissue site in the subject HT. From such a viewpoint, in the puncturing task guide mode according to the present embodiment, when a state is reached in which the puncture needle QT is detected in the ultrasonic image following the advancement of the puncture needle QT into the subject HT at the puncturing task, it is notified that the puncture needle QT has been detected.

Note that the ultrasonic image analyzer 19e performs image analysis on ultrasonic images sequentially generated by the ultrasonic probe 20 by, for example, a publicly known pattern recognition process, and detects the distal end of the puncture needle QT appearing in the ultrasonic images.

Figure 14:
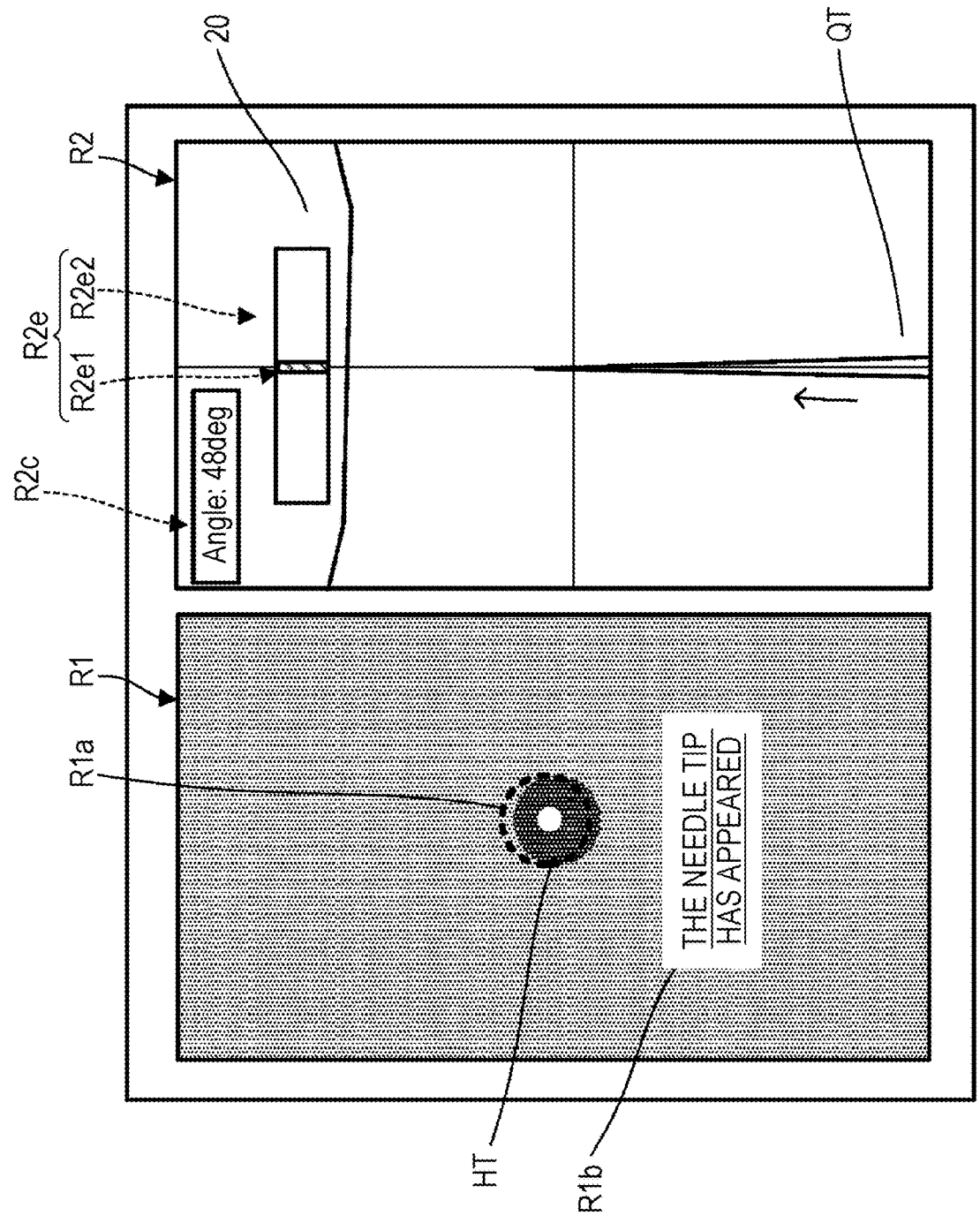
FIG. 14 is a diagram illustrating an example of a notification mode during puncture needle detection by a display controller according to the second embodiment.

FIG. 14 is a diagram illustrating an example of a notification mode during detection of the puncture needle QT by the display controller 19d according to the present embodiment. FIG. 14 illustrates a message notification of "The needle tip has appeared" on the screen of the monitor 16 as an example of the notification mode during detection of the puncture needle QT by the display controller 19d.

Note that the notification mode during detection of the puncture needle QT is not limited to a message notification, and may be a notification mode that uses a picture or a pattern. In addition, the notification during detection of the puncture needle QT is not limited to the notification mode by display on the monitor 16, and may be a notification using a speaker or a lighting device.

As described above, the ultrasonic diagnostic apparatus 1 according to the present embodiment is useful in allowing the user to reliably recognize that the distal end of the puncture needle QT has arrived at the region immediately below the ultrasonic image R1.

Third Embodiment

Figure 15:
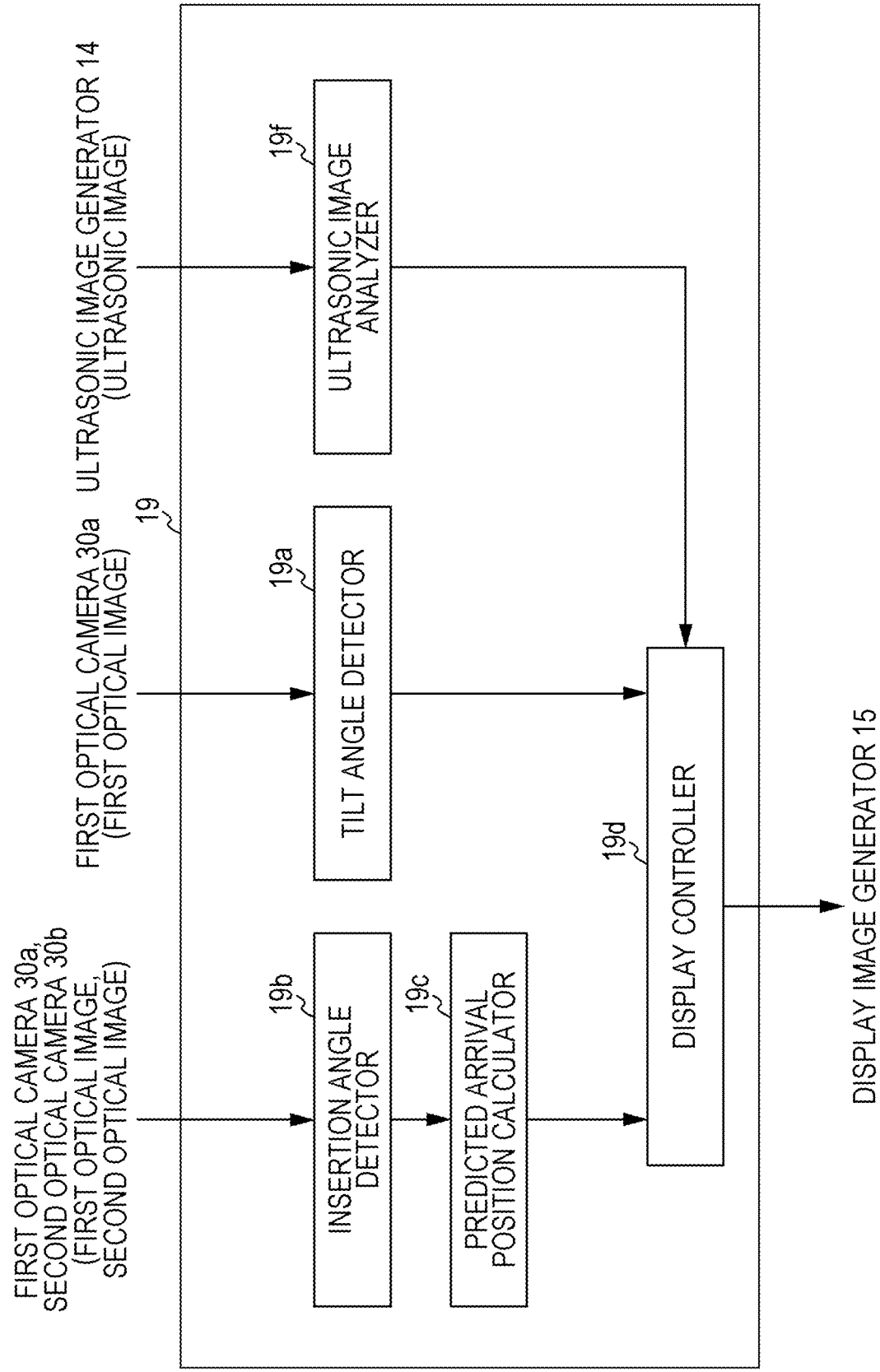
FIG. 15 is a diagram illustrating an example of a configuration of the controller of the ultrasonic diagnostic apparatus according to a third embodiment.

FIG. 15 is a diagram illustrating an example of a configuration of the controller 19 of the ultrasonic diagnostic apparatus 1 according to the third embodiment. FIG. 14 is a diagram illustrating an example of a notification mode during detection of the puncture needle QT by the display controller 19d according to the present embodiment.

The controller 19 according to the present embodiment differs from the controller 19 according to the first embodiment by further including an ultrasonic image analyzer 19f that performs image analysis on the ultrasonic image R1 to detect a target site shown in the ultrasonic image R1, and the display controller 19d changing a display mode of the guide image R1a indicating the predicted arrival position of the puncture needle QT based on whether or not the predicted arrival position overlaps the target site.

It is convenient for the user to be able to more easily recognize whether or not the predicted arrival position of the puncture needle QT coincides with the position of the target site during the puncturing task. From such a viewpoint, in the puncturing task guide mode according to the present embodiment, changes in the display of the predicted arrival position guide image R1a express whether or not the predicted arrival position of the puncture needle QT coincides with the position of the target site at the puncturing task.

Note that the ultrasonic image analyzer 19f performs image analysis on the ultrasonic image by, for example, a publicly known pattern recognition process, and detects the position of the target site shown in the ultrasonic image.

Figure 16:
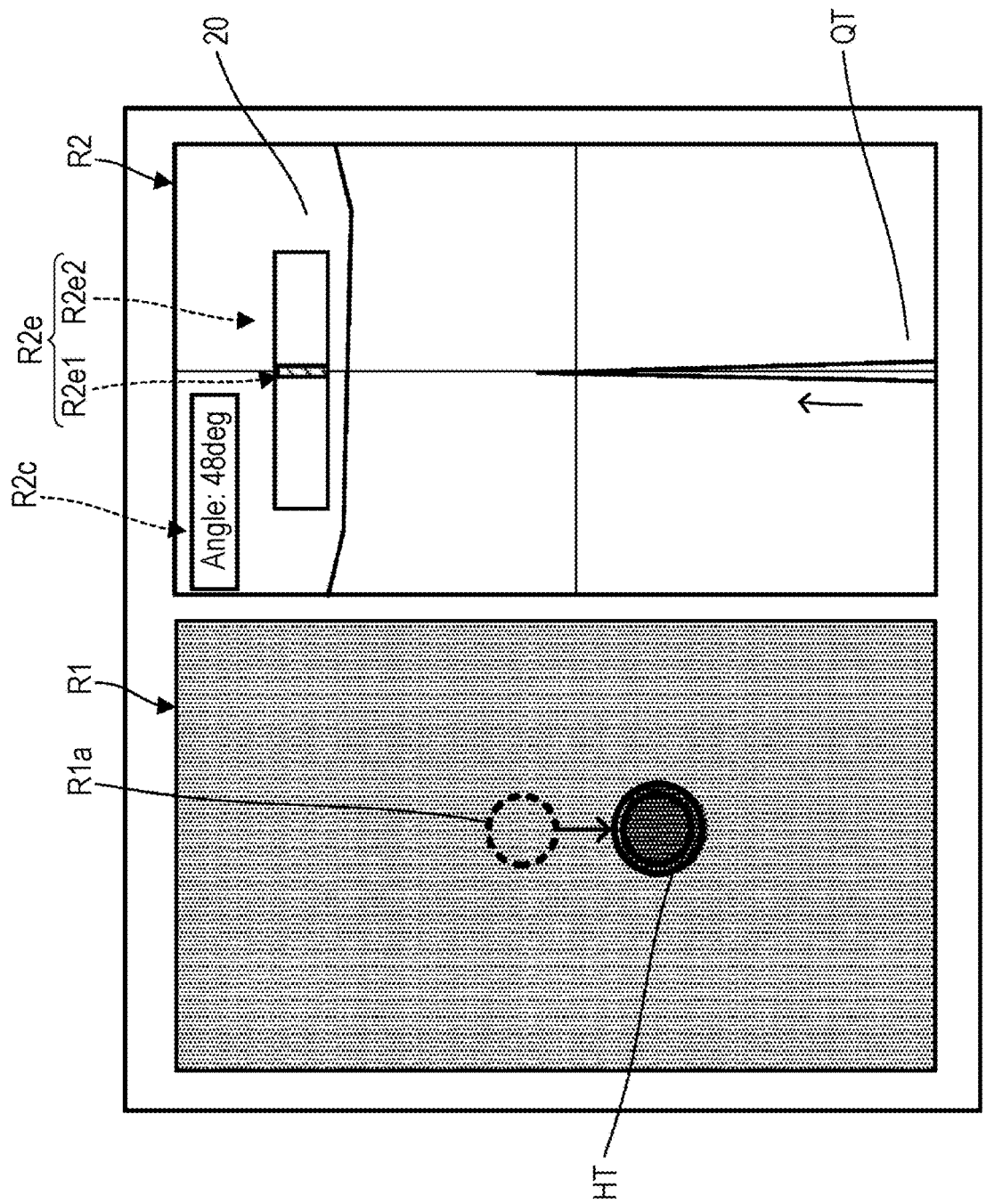
FIG. 16 is a diagram illustrating an example of a display mode of a guide image indicating a predicted arrival position by the display controller according to the third embodiment.

FIG. 16 is a diagram illustrating an example of a display mode of the guide image R1a indicating the predicted arrival position by the display controller 19d according to the present embodiment.

For example, as illustrated in FIG. 16, when the predicted arrival position does not overlap with the target site in the ultrasonic image R1, the display controller 19d displays the predicted arrival position guide image R1a of the puncture needle QT as a circular image drawn with a dotted line in the ultrasonic image R1. Also, for example, when the predicted arrival position of the puncture needle QT overlaps with the target site in the ultrasonic image, the display controller 19d changes the predicted arrival position guide image R1a of the puncture needle QT so as to be highlighted with an image of a double circle in the ultrasonic image.

As described above, the ultrasonic diagnostic apparatus 1 according to the present embodiment is useful in that it allows the user to more easily recognize the positional relationship between the position of the target site HTa shown in the ultrasonic image R1 and the predicted arrival position predicted from a current insertion angle of the puncture needle QT.

Fourth Embodiment

Normally, the ultrasonic probe 20 is used in a state of being substantially perpendicular to the body surface of the subject HT. However, depending on the user, the user may use the ultrasonic probe 20 in a state of being slightly inclined relative to the body surface of the subject HT. Since the insertion angle detector 19b described in the first embodiment is configured to calculate the insertion angle of the puncture needle QT on the assumption that the ultrasonic probe 20 is in a state of being substantially perpendicular to the body surface of the subject HT, when the ultrasonic probe 20 is inclined relative to the body surface of the subject HT, a calculation result thereof includes an error (for example, it includes an angle error corresponding to the inclination angle of the ultrasonic probe 20).

From such a viewpoint, the ultrasonic diagnostic apparatus 1 according to the present embodiment further includes a probe posture detector that detects an inclination angle of the ultrasonic probe 20 relative to the body surface of the subject HT and outputs the inclination angle as correction information when calculating the insertion angle of the puncture needle QT or as guidance information for adjusting a posture of the ultrasonic probe 20 relative to the user.

Figure 17:
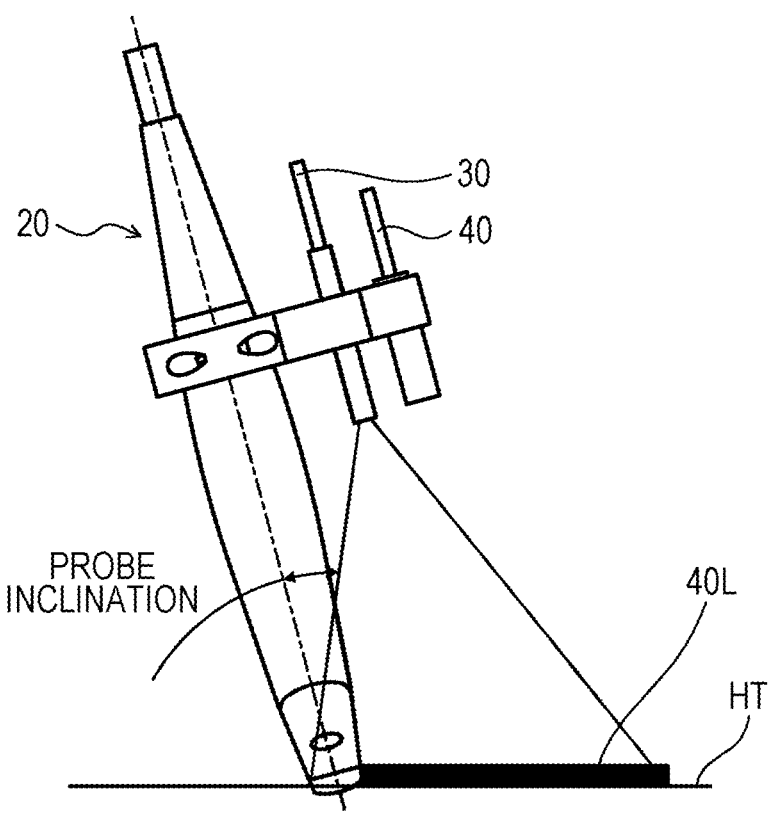
FIG. 17 is a diagram illustrating an example of a method in which a probe posture detector detects an inclination angle of the ultrasonic probe relative to the body surface of the subject in the ultrasonic diagnostic apparatus according to a fourth embodiment.

FIG. 17 is a diagram illustrating an example of a method in which the probe posture detector detects the inclination angle of the ultrasonic probe 20 relative to the body surface of the subject HT.

The probe posture detector according to the present embodiment detects the inclination angle of the ultrasonic probe 20 relative to the body surface of the subject HT, with the linear projection image 40L of the laser beam emitted from the laser pointer 40 on the body surface of the subject HT as a reference. Specifically, when, for example, the ultrasonic probe 20 is pressed on the body surface of the subject HT, the probe posture detector performs image analysis on the first optical image captured by the first optical camera 30a and the second optical image captured by the second optical camera 30b, and detects the inclination angle of the ultrasonic probe 20 relative to the body surface of the subject HT using the stereo camera principle.

Note that since the method of calculating the inclination angle using the stereo camera principle is similar to the insertion angle detection of the puncture needle QT described with reference to FIGS. 11A and 11B, a detailed description is omitted here, however, while when the ultrasonic probe 20 is in a state of being substantially perpendicular to the body surface of the subject HT, the distances of each point of the linear projection image 40L from the first optical camera 30a are the same, when the ultrasonic probe 20 has an inclination angle relative to the body surface of the subject HT, the inclination angle can be calculated from a difference between the distances of each point of the linear projection image 40L from the first optical camera 30a.

The controller 19 according to the present embodiment calculates a final insertion angle θ' of the puncture needle QT by, for example, subtracting only the inclination angle detected by the probe posture detector from the insertion angle θ of the puncture needle QT calculated by the insertion angle detector 19b (that is, correction is performed).

Note that, here, a mode has been mainly described in which the inclination angle of the ultrasonic probe relative to the body surface of the subject HT is used as the correction information when calculating the insertion angle of the puncture needle QT, however the inclination angle of the ultrasonic probe 20 relative to the body surface of the subject HT may be used as guidance information for prompting the user to make a posture of the ultrasonic probe 20 substantially perpendicular to the body surface of the subject HT.

Fifth Embodiment

Figure 18:
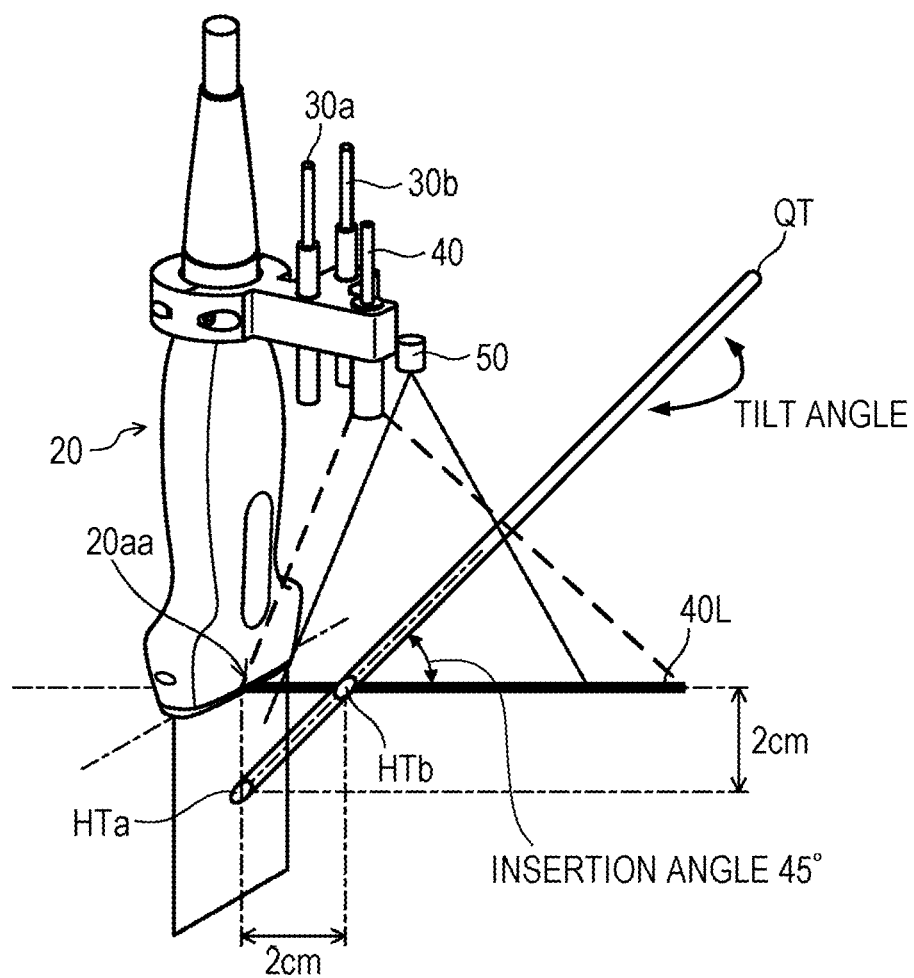
FIG. 18 is a diagram illustrating an example of a configuration of the ultrasonic probe of the ultrasonic diagnostic apparatus according to a fifth embodiment.

FIG. 18 is a diagram illustrating an example of a configuration of the ultrasonic probe 20 of the ultrasonic diagnostic apparatus 1 according to the fifth embodiment.

The ultrasonic probe 20 according to the present embodiment includes an irradiator 50 (for example, an LED lamp) that is attached to the proximal end side of the ultrasonic probe 20 and irradiates the body surface of the subject HT at the insertion task. However, when viewed from the front, an arrangement position of the irradiator 50 is on the same straight line as the first optical camera 30a or in a region on an opposite side to the second optical camera 30b, with the long axis center of the ultrasonic probe 20 as a reference.

The irradiator 50 is provided so as to enable detection of the puncture needle QT in the first optical image and the second optical image even in darkness, however, since an irradiation light of the irradiator 50 creates a shadow of the puncture needle QT, in some cases there is a possibility of inducing erroneous detection in the extension direction of the puncture needle QT. The reason is that since the puncture needle QT itself is, for example, gray, when a shadow of the puncture needle QT exists in a vicinity thereof, the puncture needle QT and the shadow of the puncture needle QT cannot be clearly separated by a subsequent image process (for example, the edge detection process and the straight line detection process), and the extension direction of the puncture needle QT is erroneously calculated.

From such a viewpoint, in the ultrasonic probe 20 according to the present embodiment, an arrangement position of the irradiator 50 is set such that the puncture needle QT itself and the shadow of the puncture needle QT are separated in the first optical image and the second optical image.

Figure 19A:
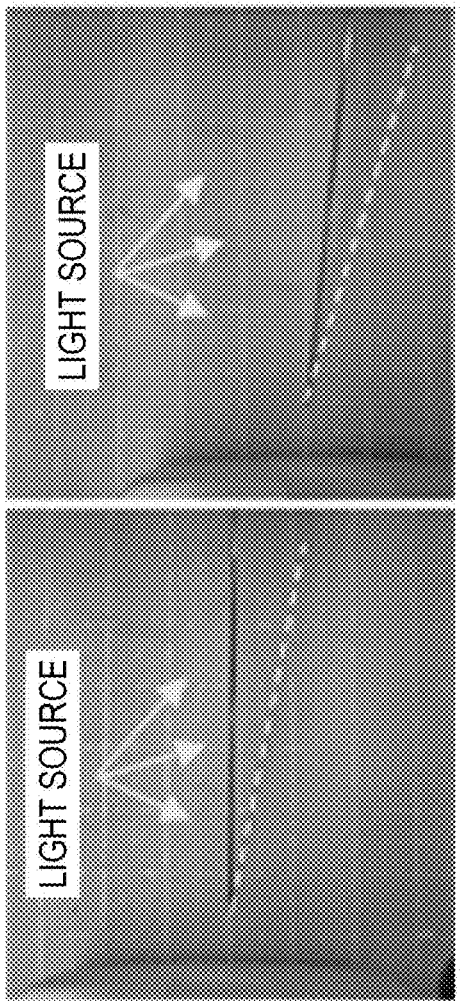
FIGS. 19A and 19B are diagrams illustrating different modes of a shadow formation position of the puncture needle depending on an arrangement position of an irradiator.
Figure 19B:
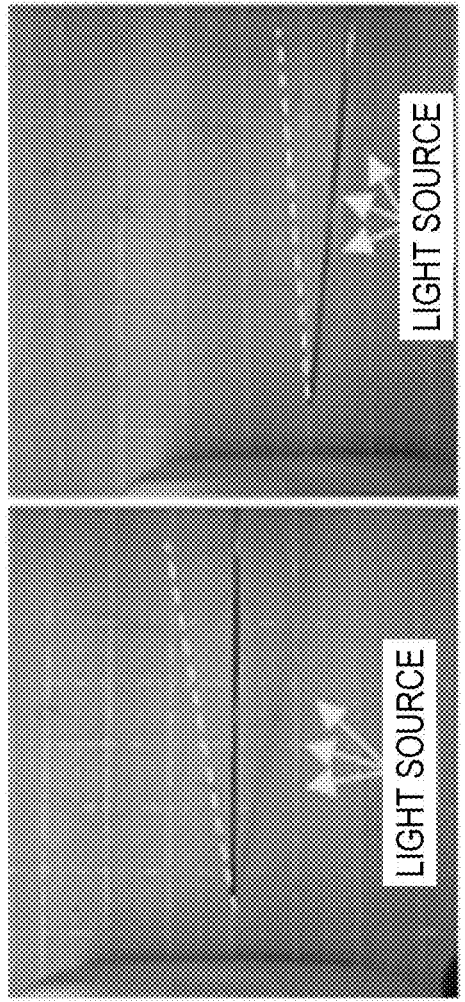

FIGS. 19A and 19B are diagrams illustrating different modes of a shadow formation position of the puncture needle QT depending on the arrangement position of the irradiator 50. FIG. 19A is a diagram illustrating the shadow formation position of the puncture needle QT (dotted line position in the figure) in a case where, when viewed from the front, the arrangement position of the irradiator 50 is in a region on the same side as the second optical camera 30b, with the long axis center of the ultrasonic probe 20 as a reference. In addition, FIG. 19B is a diagram illustrating the shadow formation position of the puncture needle QT (dotted line position in the figure) in a case where, when viewed from the front, the arrangement position of the irradiator 50 is in a region on the opposite side of the second optical camera 30b, with the long axis center of the ultrasonic probe 20 as a reference.

As can be seen from FIGS. 19A and 19B, in the second optical image, a proximity state between the puncture needle QT itself and the shadow formation position of the puncture needle QT (dotted line position in the figure) considerably differs depending on whether, when viewed from the front, the arrangement position of the irradiator 50 is in a region on the same side of the second optical camera 30b, or on the opposite side of the second optical camera 30b, with the long axis center of the ultrasonic probe 20 as a reference. That is, as shown in FIG. 19B, by setting the arrangement position of the irradiator 50 as the region on the opposite side to the second optical camera 30b, with the long axis center of the ultrasonic probe 20 as a reference, when viewed from the front, or on the same straight line of the first optical camera 30a, with the long axis center of the ultrasonic probe 20 as a reference, when viewed from the front, it is possible to clearly separate the puncture needle QT and the shadow of the puncture needle QT in the second optical image.

As described above, the ultrasonic diagnostic apparatus 1 according to the present embodiment is useful in that the predicted arrival position of the puncture needle QT and the like can be accurately displayed even when the irradiator 50 is attached to the ultrasonic probe 20 and the puncturing task is performed while irradiating from the irradiator 50.

Sixth Embodiment

The controller 19 according to the present embodiment is configured to switch an output of the laser beam from the laser pointer 40 to off when an insertion start state of the puncture needle QT into the subject HT is detected.

Since the projection image 40L of the laser beam from the laser pointer 40 to the body surface of the subject HT is linear, when the insertion angle detector 19b detects the puncture needle QT from each of the first optical image and the second optical image, the projection image 40L may be erroneously recognized as the puncture needle QT. That is, since the projection image 40L by the laser beam from the laser pointer 40 is not particularly necessary after insertion of the puncture needle QT into the subject HT is started, the projection image 40L is preferably set to an absent state from the viewpoint of the image process after insertion of the puncture needle QT into the subject HT is started.

From such a viewpoint, the controller 19 according to the present embodiment switches the output of the laser beam from the laser pointer 40 to off when the insertion start state of puncture needle QT into the subject HT is detected. Note that examples of a method of detecting the insertion start state of the puncture needle QT into the subject HT include a method of determining whether or not the distal end of the puncture needle QT coincides with a target insertion position of the puncture needle QT by performing image analysis on the first optical image.

As described above, the ultrasonic diagnostic apparatus 1 according to the present embodiment is useful in that the predicted arrival position of the puncture needle QT or the like can be displayed more accurately.

According to the ultrasonic diagnostic apparatus according to the present disclosure, it is possible to make a task of inserting a puncture needle into a living body by a user easier.

Although embodiments of the present invention have been described and illustrated in detail, the disclosed embodiments are made for purposes of illustration and example only and not limitation. The scope of the present invention should be interpreted by terms of the appended claims. The techniques described in the scope of claims include various modifications and changes to the specific examples exemplified above.

What is claimed is:

1. An ultrasonic diagnostic apparatus that assists an insertion task of a puncture needle into a subject, the ultrasonic diagnostic apparatus comprising:
   an ultrasonic probe that acquires an ultrasonic image of an inside of the subject by transmitting and receiving ultrasonic waves;
   a first capture optical camera and a second optical camera that are attached to the ultrasonic probe and capture the puncture needle at the insertion task; and
   a hardware processor that
      performs image analysis on a first captured image generated by the first optical camera and a second captured image generated by the second optical camera, and detects an insertion angle of the puncture needle relative to a body surface of the subject using a stereo camera principle,
      calculates a predicted arrival position of the puncture needle from the insertion angle, the predicted arrival position of the puncture needle being a predicted position at which the puncture needle arrives after having advanced to a region immediately below the ultrasonic probe in the subject, and
      displays a guide image indicating the predicted arrival position on a monitor so as to be superimposed on the ultrasonic image,
   wherein the ultrasonic probe includes a plurality of transducers arranged in a long axis direction of an ultrasonic transmission/reception surface at a distal end of the ultrasonic probe,
   a sound axis center of the ultrasonic probe is at a center of the distal end of the ultrasonic probe in the long axis direction, and
   when a long axis side of the distal end of the ultrasonic probe is viewed from a direction orthogonal to the long axis direction, an optical axis of the first optical camera coincides with the sound axis center of the ultrasonic probe, and an optical axis of the second optical camera is parallel to the optical axis of the first optical camera at a position displaced from the sound axis center of the ultrasonic probe.

2. The ultrasonic diagnostic apparatus according to claim 1, wherein
   the hardware processor displays, on the monitor using an indicator image, the insertion angle of the puncture needle that has been detected.

3. The ultrasonic diagnostic apparatus according to claim 1, wherein
   the hardware processor performs image analysis on a dynamic image of ultrasonic images sequentially generated in the ultrasonic probe to detect that a distal end of the puncture needle is shown in the ultrasonic images, and
   the hardware processor notifies a user that the distal end of the puncture needle is shown in the ultrasonic images at the insertion task.

4. The ultrasonic diagnostic apparatus according to claim 1, wherein
   the hardware processor performs image analysis on the ultrasonic image to detect a target region shown in the ultrasonic image, and
   the hardware processor changes a display mode of the guide image indicating the predicted arrival position based on whether or not the predicted arrival position of the puncture needle overlaps the target region.

5. The ultrasonic diagnostic apparatus according to claim 1, wherein
   the hardware processor displays the first captured image and the ultrasonic image arrayed on the same monitor.

6. The ultrasonic diagnostic apparatus according to claim 5, wherein
   the hardware processor displays the first captured image in the monitor so as to highlight an edge of the puncture needle shown in the first captured image.

7. The ultrasonic diagnostic apparatus according to claim 1, wherein
   the hardware processor detects a tilt angle of the puncture needle relative to a central axis of the ultrasonic probe by image analysis of the first captured image, and
   the hardware processor displays, in the monitor using an indicator image, the tilt angle of the puncture needle that has been detected.

8. The ultrasonic diagnostic apparatus according to claim 1, further comprising
   a probe posture detector that detects an inclination angle of the ultrasonic probe relative to the body surface of the subject, and outputs the inclination angle as correction information when calculating the insertion angle of the puncture needle, or as guidance information for adjusting a posture of the ultrasonic probe relative to the user.

9. The ultrasonic diagnostic apparatus according to claim 1, further comprising
   a laser pointer that is attached to the proximal end side of the ultrasonic probe and guides a target posture of the puncture needle when the puncture needle is inserted into the subject by emitting a laser beam on the body surface of the subject to form a predetermined projection image.

10. The ultrasonic diagnostic apparatus according to claim 9, wherein
    the hardware processor switches an output of the laser beam from the laser pointer to off when an insertion start state of the puncture needle into the subject is detected.

11. The ultrasonic diagnostic apparatus according to claim 9, further comprising
    a probe posture detector that detects an inclination angle of the ultrasonic probe relative to the body surface of the subject using the stereo camera principle based on the predetermined projection image on the body surface of the subject captured by each of the first capture part and the second capture part when the ultrasonic probe is pressed on the body surface of the subject.

12. The ultrasonic diagnostic apparatus according to claim 1, comprising an irradiator that is attached to the proximal end side of the ultrasonic probe and irradiates the body surface of the subject at the insertion task, wherein when viewed from the front, the irradiator is disposed on the same straight line as the first optical camera or in a region on an opposite side to the second optical camera, with a long axis center of the ultrasonic probe as a reference.

13. The ultrasonic diagnostic apparatus according to claim 1, wherein the hardware processor detects the puncture needle from each of the first captured image and the second captured image, specifies a first coordinate of a first representative point of the puncture needle shown in the first captured image, specifies a second coordinate of the first representative point of the puncture needle shown in the second captured image, calculates a parallax Sa of the first representative point of the puncture needle between the first coordinate and the second coordinate, specifies a third coordinate of a second representative point of the puncture needle shown in the first captured image, specifies a fourth coordinate of the second representative point of the puncture needle shown in the second captured image, calculates a parallax Sb of the second representative point of the puncture needle between the third coordinate and the fourth coordinate, calculates a distance Za from the first optical camera to the first representative point of the puncture needle from the stereo camera principle using the parallax Sa, calculates a distance Zb from the first optical camera to the second representative point of the puncture needle from the stereo camera principle using the parallax Sb, detects a distance Xa from the distal end of the ultrasonic probe to the first representative point of the puncture needle in a plan view from the first captured image, detects a distance Xb from the distal end of the ultrasonic probe to the second representative point of the puncture needle in a plan view from the first captured image, detects the insertion angle of the puncture needle relative to the body surface of the subject using the distance Za, the distance Zb, the distance Xa and the distance Xb, and calculates the predicted arrival position of the puncture needle using the insertion angle and the distance Xa.

14. The ultrasonic diagnostic apparatus according to claim 5, wherein the hardware processor adds an edge-enhanced image in the first captured image displayed in the monitor so as to highlight an edge of the puncture needle shown in the first captured image.

15. The ultrasonic diagnostic apparatus according to claim 1, wherein the hardware processor detects an extension direction of the puncture needle on the first captured image by image analysis of the first captured image, detects a tilt angle of the puncture needle relative to a central axis of the ultrasonic probe from an angle between the direction orthogonal to the long axis direction of the distal end of the ultrasonic probe and the extension direction of the puncture needle, and displays, in the monitor using an indicator image, the tilt angle of the puncture needle that has been detected.

16. The ultrasonic diagnostic apparatus according to claim 9, wherein the first optical camera and the second optical camera are attached to the ultrasonic probe such that the predetermined projection image formed by emitting the laser beam on the body surface of the subject from the laser pointer is shown in the first captured image generated by the first optical camera and in the second captured image generated by the second optical camera, respectively, the predetermined projection image is a linear projection image, and the ultrasonic diagnostic apparatus comprises a probe posture detector that calculates an inclination angle of the ultrasonic probe relative to the body surface of the subject using the stereo camera principle based on a difference between distances of each point of the linear projection image included in the first captured image and the second captured image from the first optical camera when the ultrasonic probe is pressed on the body surface of the subject.

* * * * *